US012749249B2

(12) United States Patent
An et al.

(10) Patent No.: US 12,749,249 B2
(45) Date of Patent: Sep. 29, 2026

(54) METHOD AND APPARATUS FOR CREATING VIRTUAL ENTITY, DEVICE AND MEDIUM

(71) Applicant: Beijing Zitiao Network Technology Co., Ltd., Beijing (CN)

(72) Inventors: Tongchen An, Beijing (CN); Fengyi Ye, Beijing (CN); Lechao Lin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 42 days.

(21) Appl. No.: 18/617,141

(22) Filed: Mar. 26, 2024

(65) Prior Publication Data

US 2024/0331254 A1 Oct. 3, 2024

(30) Foreign Application Priority Data

Mar. 29, 2023 (CN) ......................... 202310328232.9

(51) Int. Cl.
*G06T 13/40* (2011.01)

(52) U.S. Cl.
CPC .................................... *G06T 13/40* (2013.01)

(58) Field of Classification Search
CPC . G06T 13/40; G06T 17/00; A63F 2300/6607; A63F 13/63; G06F 3/0484
See application file for complete search history.

(56) References Cited

U.S. PATENT DOCUMENTS

2008/0129737 A1* 6/2008 Lee ......................... G06T 13/40 345/473
2012/0019517 A1* 1/2012 Corazza .................. G06T 17/20 345/419
2017/0263051 A1* 9/2017 Shipkov .................. G06T 19/20
2019/0108681 A1* 4/2019 Mcbeth ................. G06T 19/006
2020/0226827 A1* 7/2020 Kim .......................... G06T 7/50
2022/0105389 A1* 4/2022 Lianides ............ A63B 24/0075
2023/0120883 A1* 4/2023 Makeev .................. G06T 13/40 345/474
2024/0061975 A1* 2/2024 Harvey ................... G06T 11/60
2024/0127521 A1* 4/2024 Tin Nyo ................. G06T 13/40

FOREIGN PATENT DOCUMENTS

CN 112712578 A 4/2021
CN 112843701 A * 5/2021 ............. A63F 13/52
CN 113742460 A 12/2021
CN 115115814 A * 9/2022 ............. G06T 19/20

OTHER PUBLICATIONS

"Characters", Creator Hub, 2024, pp. 1-6.

* cited by examiner

*Primary Examiner* — Maurice L. Mcdowell, Jr.

(57) ABSTRACT

A method and apparatus for creating a virtual entity, a device and a medium are provided. The method includes: in response to an instruction for creating the virtual entity, presenting a skeletal model of the virtual entity in a virtual space, the skeletal model including at least two bones; determining at least one first target virtual object; and binding each first target virtual object to a corresponding bone to create a target virtual entity.

20 Claims, 15 Drawing Sheets

METHOD AND APPARATUS FOR CREATING VIRTUAL ENTITY, DEVICE AND MEDIUM

CROSS-REFERENCE TO RELATED APPLICATION

The present application claims priority of the Chinese Patent Application No. 202310328232.9, filed on Mar. 29, 2023, the entire disclosure of which is incorporated herein by reference as part of the present application.

TECHNICAL FIELD

Embodiments of the application relate to the technical field of computers, in particular to a method and apparatus for creating a virtual entity, a device and a medium.

BACKGROUND

With the ongoing advancement of Extended Reality (XR) technology, people can interact with other people through a virtual entity in a virtual space using the XR device. This includes activities like exchanging greetings, having conversations, and participating in various forms of entertainment together. This more immersive form of communication allows for a better connection between people.

Currently, the creation of the virtual entity is usually carried out by professional technicians. This creation process includes several steps. The first step involves the conceptual design of the virtual entity, where original painting for a virtual entity is created. The second step involves modeling, creating a skeleton, binding a bone to a virtual object, skinning the skeleton and fine-tuning skin weights within 3D art software. Upon completing these steps, a virtual entity is successfully created.

However, the aforementioned method of creating virtual entities poses a challenge for the ordinary user seeking to customize their own virtual entities. It requires them to learn and proficiently use 3D art software, as well as acquire the necessary professional knowledge for virtual entity creation. This level of complexity hinders the ability of the ordinary user to create virtual entities and consequently dampens the enthusiasm of the ordinary user to create the virtual entity.

SUMMARY

Embodiments of the present disclosure provides a method for creating a virtual entity, and the method includes:

- in response to an instruction for creating the virtual entity, presenting a skeletal model of the virtual entity in a virtual space, the skeletal model including at least two bones;
- determining at least one first target virtual object; and
- binding each first target virtual object to a corresponding bone to create a target virtual entity.

Embodiments of the present disclosure provides an apparatus for creating a virtual entity, and the apparatus includes:

- a skeleton presentation module, configured to, in response to an instruction for creating the virtual entity, present a skeletal model of the virtual entity in a virtual space, the skeletal model including at least two bones;
- an object determination module, configured to determine at least one first target virtual object; and
- an entity creation module, configured to bind each first target virtual object to a corresponding bone to create a target virtual entity.

Embodiments of the present disclosure provide an electronic device, the electronic device includes:

- a processor and a memory, the memory is configured to store computer programs and the processor is configured to call and run the computer programs stored in the memory to execute the method for creating the virtual entity as described in the above embodiments various implementations thereof.

Embodiments of the present disclosure provide a non-transient computer-readable storage medium for storing computer programs, the computer programs cause the processor to execute the method for creating the virtual entity as described in the above embodiments or various implementations thereof.

Embodiments of the present disclosure provide a computer program product including program instructions, when the program instructions are run on an electronic device, cause the electronic device to execute the method for creating the virtual entity as described in the above embodiments or various implementations thereof.

BRIEF DESCRIPTION OF DRAWINGS

To clearly illustrate the technical solution of the embodiments of the present disclosure, the drawings required in the description of the embodiments will be briefly described in the following; it is obvious that the described drawings are only some embodiments of the present disclosure. For those skilled in the art, other drawings can be obtained based on these drawings without any inventive work.

DETAILED DESCRIPTION

The technical solutions of the embodiments of the present disclosure will be described clearly and fully understandable in conjunction with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

It should be noted that the terms “first”, “second”, etc. in the description and claims of the present disclosure, as well as the drawings, are used to distinguish similar objects and do not need to be used to describe a specific sequence or order. It should be understood that the data used in this way can be interchanged in appropriate cases so that the embodiments of the present disclosure described here can be implemented in order other than those illustrated or described here. In addition, the terms “comprise/comprising” and “include/including” and any variations thereof are intended to cover a non-exclusive inclusion. For example, a process, method, system, product, or server that includes a series of steps or units, need not be limited to those clearly listed steps or units but may include other steps or units that are not clearly listed or inherent to these processes, methods, products, or devices.

In the embodiments of the present disclosure, terms such as “exemplary” or “for example” are used to indicate examples or instances for illustration or explanation. Any embodiment or solution disclosed as “exemplary” or “for example” in the embodiments of the present disclosure should not be interpreted as being more preferred or advantageous than other embodiments or solutions. Specifically, the use of terms such as “exemplary” or “for example” is intended to present relevant concepts in a specific manner.

Considering the challenge faced by the ordinary user in customizing a virtual entity in a virtual space, such as the need to learn and master 3D art software and acquire professional knowledge related to the virtual entity creation, which makes it difficult for the ordinary user to create the virtual entity and consequently dampens the enthusiasm of the ordinary user to create the virtual entity, the present disclosure provides a solution for creating a virtual entity, which can reduce the difficulty of creating the virtual entity and simplify the step for creating the virtual entity for the ordinary user, enable the ordinary user to have a higher level of freedom in creating the virtual entity, and improve the enthusiasm of the ordinary user in creating the virtual entity.

A method for creating a virtual entity provided by an embodiment of the present disclosure will be described in detail below with reference to the drawings.

Figure 1:
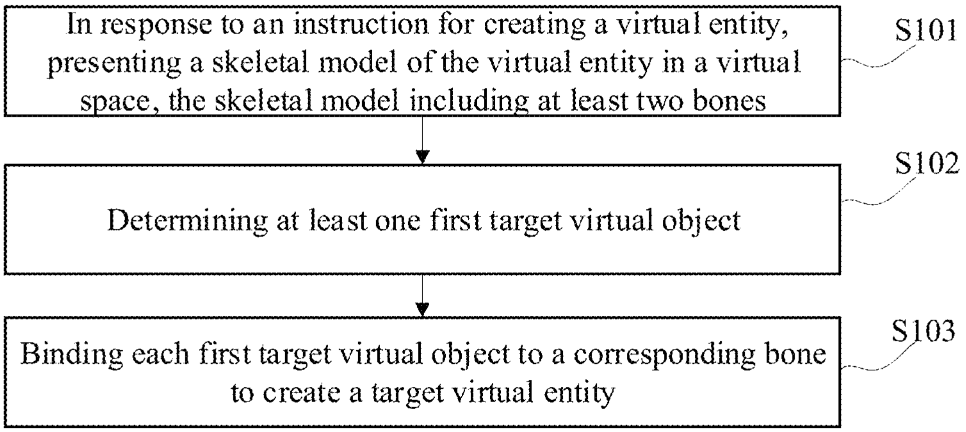
FIG. 1 is a flowchart of a first method for creating a virtual entity according to an embodiment of the present disclosure.

FIG. 1 is a flowchart of a method for creating a virtual entity according to an embodiment of the present disclosure. The method for creating a virtual entity provided by the embodiment of the present disclosure can be executed by an apparatus for creating a virtual entity. The apparatus for creating a virtual entity can be composed of hardware and/or software, and can be integrated in an electronic device. In the present disclosure, the electronic device can be any hardware device that can provide a virtual space. For example, the electronic device can be an XR device, a mobile phone (such as a foldable phone, a large screen mobile phone, etc.) or a tablet computer, and the specific type of the electronic device is not specifically limited in the present disclosure. The XR device can be a VR device, an AR device or an MR device.

As illustrated in FIG. 1, the method includes the following steps.

S101, in response to an instruction for creating a virtual entity, presenting a skeletal model of the virtual entity in a virtual space, the skeletal model including at least two bones.

It should be understood that the virtual space in the present disclosure is a combination of real scene and virtual scene through the electronic device, so as to provide the user (ordinary user or operator) with a virtual environment for human-computer interaction. Moreover, the virtual space can be displayed as a three-dimensional image.

In the embodiment of the present disclosure, the skeletal model can be determined according to the type of the virtual entity. For example, when the virtual entity is a virtual character (Avatar), then the skeletal model is a humanoid skeletal model. For another example, when the virtual entity is a virtual building (such as a virtual skyscraper), then the skeletal model is a building skeletal model. For yet another example, when the virtual entity is a virtual animal (such as a virtual cat or a virtual dog), then the skeletal model is an animal skeletal model.

In other words, the skeletal model in the present disclosure can be a humanoid skeletal model, an animal skeletal model, or a skeletal model of other entities, and there is no specific limitation here.

Moreover, the skeletal model in the present disclosure can be acquired from a pre-generated initial virtual entity. The process involves performing operations, such as de-skinning, on the initial virtual entity model to acquire a skeletal model with only skeletal elements. In addition to acquiring the skeletal model, the present disclosure also preserves inverse kinematics (IK) data. It is important to understand that IK is a significant tool for enhancing animation quality and showcasing animation details.

It should be noted that the initial virtual entity model refers to a default virtual entity model pre-created in the virtual space.

In order to clearly explain the present disclosure, a detailed description will be provided below, taking the skeleton model as a humanoid skeleton model as an example.

Figure 2:
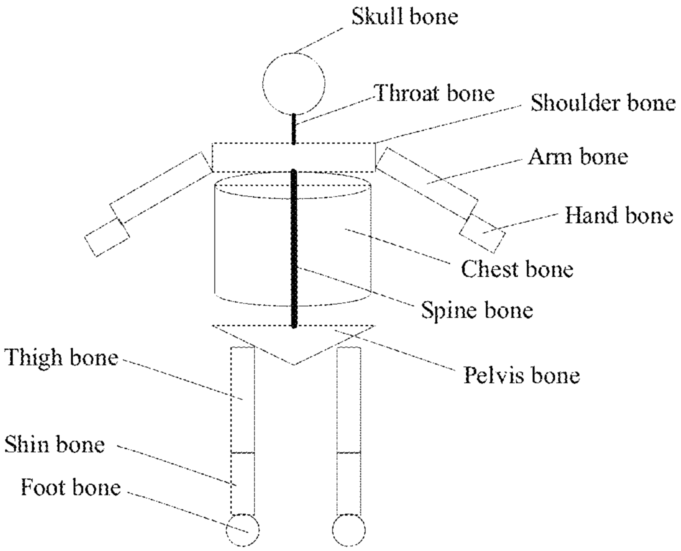
FIG. 2 is a schematic diagram of a humanoid skeletal model according to an embodiment of the present disclosure.

As illustrated in FIG. 2, the at least two bones of the humanoid skeletal model include but are not limited to the following: a skull bone, a throat bone, a shoulder bone, a chest bone, a spine bone, an arm bone, a hand bone, a pelvis bone, a thigh bone, a shin bone and a foot bone.

Optionally, when the user uses an electronic device in a working state, the user may select and enter any virtual space provided by the device. In the case that the electronic device is not powered on, the user need to first switch it on to activate it. Then, the user can select and enter the corresponding virtual space based on the various virtual spaces provided by the electronic device. It is understood that entering the virtual space means displaying virtual content in the virtual space to the user, and also displaying virtual content in the virtual space according to the position and posture of the user's electronic display device in the real environment.

The above-mentioned entry into the virtual space can be achieved by the user triggering any application and entering the associated virtual space. For example, when the user selects any XR application on a main interface of the electronic device in a working state, the electronic device opens the XR application and allows the entry into the XR space according to a selection instruction from the user. Of course, entering the virtual space can also be done through other means, such as voice, which is not limited here.

After entering the virtual space, the user can send an instruction for creating a virtual entity to the electronic device by triggering an entity creation control in the virtual space or sending an entity creation voice instruction. When the instruction for creating the virtual entity is received, a skeletal model of the virtual entity and at least one candidate virtual object can be presented in the virtual space. In this way, the user can create the customized virtual entity based on the presented at least one candidate virtual object and the skeletal model.

Figure 3:
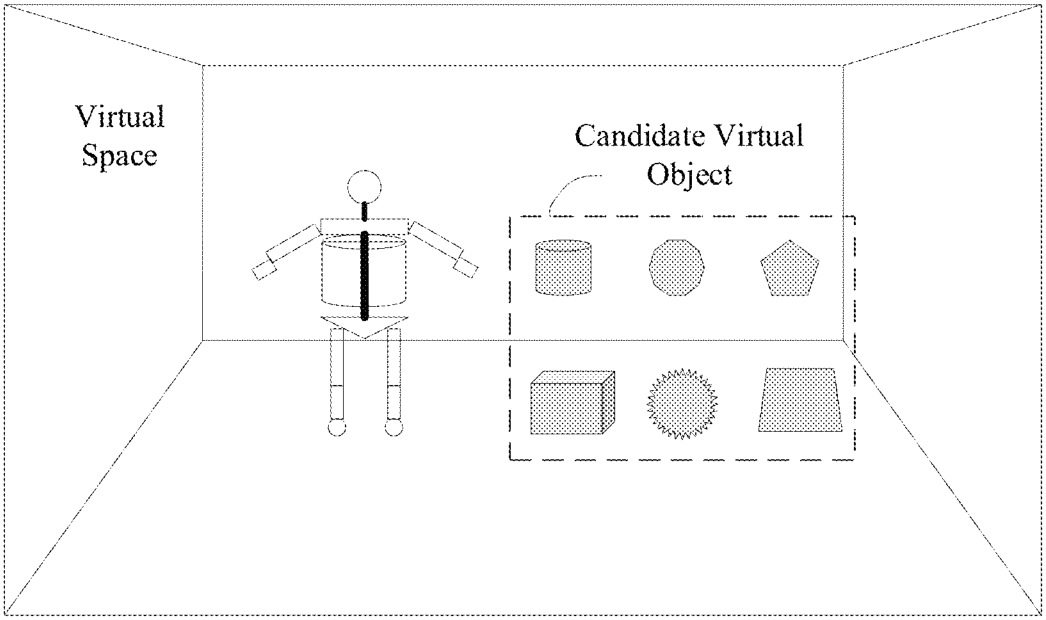
FIG. 3 is a schematic diagram illustrating the presentation of a skeletal model and at least one candidate virtual object in a virtual space according to an embodiment of the present disclosure.

FIG. 3 illustrates a skeletal model of a virtual entity and at least one candidate virtual object presented in a virtual space as an example.

It should be understood that the candidate virtual object in the present disclosure can be understood as an element for creating the virtual entity. For example, the element may be selected as a geometric body of various shapes or a combination of a plurality of geometric bodies, as illustrated in FIG. 3. Of course, elements other than geometric bodies, such as a part model symbolizing the matching of various parts of the virtual entity, are also applicable, which is not limited in the present disclosure.

In the present disclosure, the display positions of the aforementioned skeletal model and at least one candidate virtual object can be adjusted by the user, so as to enable the user to modify the display positions of the skeletal model and/or at least one candidate virtual object based on the specific creation requirement, and allow the user to observe the skeletal model and/or at least one candidate virtual object from different angles.

It should be noted that the virtual object or virtual entity in the present disclosure refers to an interactive object in a virtual scene, which is controlled by the user or a robot program (such as a robot program based on artificial intelligence) and can stand still, move and perform various behaviors in the virtual scene, such as various characters in the interactive scene.

S102, determining at least one first target virtual object.

The first target virtual object can be understood as an object that constitutes a specific body part of the virtual entity.

It is considered that in addition to the skeleton model presented in the virtual space, at least one candidate virtual object is also presented. Therefore, the user can use at least one candidate virtual object to determine the first target virtual object corresponding to each bone on the skeleton model. The first target virtual object corresponding to each bone on the skeletal model may be identical or different, which is not limited here.

In other words, in the present disclosure, the at least one first target virtual object may be determined based on the at least one candidate virtual object presented in the virtual space.

In some implementations, when determining the first target virtual object corresponding to each bone on the skeletal model, the user may manipulate a virtual handset, by using a controller and the like, to hover over any candidate virtual object in the virtual space, and then press a confirm button (e.g., trigger button or any combination of buttons) to select the candidate virtual object. Then, the selected candidate virtual object can be dragged to a suitable position and the confirm button can be released to place the selected candidate virtual object at the suitable position.

In the case that the user wants to take the selected candidate virtual object as the first target virtual object, the selection operation on the candidate virtual object can be stopped.

In the case that the user wants to generate the first target virtual object based on a plurality of candidate virtual objects, the user may repeatedly manipulate the virtual handset, by using the controller and the like, to select the candidate virtual objects and place the candidate virtual objects at suitable positions. Each selected candidate virtual object is placed at a different suitable position to avoid the plurality of candidate virtual objects overlapping each other and causing obstruction. In the present disclosure, "a plurality of" refers to two or more.

Subsequently, after the selection of the candidate virtual objects is completed, the first target virtual object can be generated based on the selected plurality of candidate virtual objects.

It can be understood that in addition to the above-described way of determining the first target virtual object, the user may also interact with any of the candidate virtual objects in alternative ways through a virtual object in the virtual space corresponding to the controller. The virtual object in the virtual space corresponding to the controller can be a virtual handset or a virtual hand, which is not limited here. The position and/or posture of the virtual object in the virtual space corresponding to the controller are determined based on the position and/or posture of the controller in the real space.

The virtual handset can be understood as a controller model that corresponds to the controller and is displayed in the virtual space, and the virtual hand refers to a hand model that corresponds to the user's real hand and is displayed in the virtual space.

In some optional implementations, the first target virtual object is generated based on the selected plurality of virtual objects as follows. Firstly, the user may manipulate the virtual handset, by using the controller and the like, to box-select the plurality of candidate virtual objects. Next, by pressing a preset button (such as a menu button) on the controller, a menu interface associated with the menu button is displayed in the virtual space. From the menu interface, the user can select a "grouping" option, and according to the grouping instruction triggered by the user, the electronic device groups the plurality of box-selected candidate virtual objects, resulting in a first object group. Finally, the obtained first object group is determined as the first target virtual object.

In the embodiment of the present disclosure, the controller can be, but is not limited to: a handset, a hand controller, a bracelet, a ring, a wristband, gloves or other handheld devices with keys.

S103, binding each first target virtual object to a corresponding bone to create a target virtual entity.

Optionally, in the present disclosure, the virtual handset can be manipulated, through the controller and the like, to bind each first target virtual object to the corresponding bone, thereby creating the target virtual entity. Herein, binding may also be understood as mounting.

In some implementations, the process of, manipulating the virtual handset, through the controller and the like, to bind each first target virtual object to the corresponding bone, thereby creating the target virtual entity, is realized as follows.

The virtual handset is manipulated, through the controller and the like, to be positioned on each first target virtual object. While pressing the confirm button, the controller is moved to control the movement of the virtual handset. In response to a virtual handset movement control instruction, the electronic device controls each first target virtual object to move along with the virtual handset, thus realizing the customized creation of the target virtual entity by manipulating the virtual handset to bind each first target virtual object to the corresponding bone. By controlling the movement of the first target virtual object through the manipulation of the virtual handset, the visibility of the manipulation on the movement of the first target virtual object is significantly enhanced, thus facilitating the binding operation.

In the present disclosure, binding the first target virtual object to the corresponding bone can be understood as establishing a corresponding relationship between the first target virtual object and the corresponding bone, and this corresponding relationship will be saved along with the corresponding bone.

Moreover, after the first target virtual object moves, the relative pose of the first target virtual object may be recorded, so that the user can easily and accurately bind the first target virtual object to the corresponding bone in the desired position and posture, without the need for programming or configuring the pose coordinates of the first target virtual object. This simplifies the binding process. The relative pose of the first target virtual object can be understood as the relative position and posture information of the first target virtual object relative to its corresponding bone.

Considering that the skeletal model includes a plurality of bones, optionally, every time a first target virtual object is determined, the first target virtual object can be bound to the corresponding bone. As a result, the creation of the target virtual entity can be ensured to be in order, thereby improving the efficiency of the creation of the target virtual entity.

In some optional implementations, after each first target virtual object is bound to the corresponding bone, the relative pose information of the first target virtual object relative to the corresponding bone can be determined, the corresponding bone refers to the bone that is bound to the first target virtual object. The pose information specifically includes position information and posture information, and the relative pose information includes the relative position and posture information between the first target virtual object and its corresponding bone.

In addition, whether a control input signal of the target virtual entity is acquired can also be detected in real time, the control input signal can be understood as an input signal that controls the action of the target virtual entity. When the control input signal of the target virtual entity is acquired, a pose of at least one bone in the skeletal model of the virtual entity is determined according to the control input signal. Further, the pose of each first target virtual object is determined according to the pose of at least one bone and the relative pose of the first target virtual object relative to the corresponding bone, and the first target virtual object is displayed according to the pose.

For example, when the target virtual entity is a virtual human character, the control input signal can be a signal of the position and posture input by a user's XR display device worn on the head and the control handset. According to the corresponding relationship between the control input signal and the humanoid skeletal model, the pose of at least one bone in the humanoid skeletal model is determined, and then the virtual human character based on user control is displayed.

That is to say, the pose of the first target virtual object is determined according to the pose and relative pose of at least one bone in the skeletal model, so that the movement of a bone can drive the first target virtual object bound to the bone to move together, allowing the user to observe the action of the target virtual entity corresponding to the control input signal.

According to the technical solution provided by the embodiment of the present disclosure, based on an instruction for creating a virtual entity, a skeletal model of the virtual entity is presented in a virtual space. Subsequently, at least one first target virtual object is determined, followed by binding each first target virtual object to a corresponding bone in the skeletal model to create a target virtual entity. By presenting the skeletal model of the virtual entity in the virtual space, the present disclosure enables an ordinary user to customize the virtual entity by mounting a virtual object onto each bone of the skeletal model. This allows the ordinary user to easily customize a virtual entity without the need to learn and master 3D art software or gain specialized knowledge in virtual entity creation. This can reduce the difficulty of creating the virtual entity by the ordinary user, simplify the steps of customization of the virtual entities by the ordinary user, enable the ordinary user to have a higher level of freedom in creating the virtual entity, and improve the enthusiasm of the ordinary user in creating the virtual entity.

Based on the above embodiment, after creating the target virtual entity, the present disclosure may further include: adjusting the pose and/or size of the first target virtual object bound to any bone in the skeletal model.

After the first target virtual object is bound to the corresponding bone, it may be necessary to adjust the first target virtual object for personalized reasons such as being too big, too small, or incorrectly positioned, so as to enhance the matching degree between the first target virtual object and the corresponding bone, or to cater to the individualized needs of the user.

In some optional implementations, the user can adjust the pose and/or size of the first target virtual object bound to any bone by manipulating the virtual handset through the controller and the like. While adjusting the pose and/or size of the first target virtual object, the offset and rotation of the first target virtual object relative to a center point of the corresponding bone may be recorded in real time, and the scaling of the first target virtual object itself may also be recorded.

After the pose and/or size adjustment of the first target virtual object is finished, the final relative pose and/or final size information of the first target virtual object relative to the corresponding bone can be determined, so that when the user later controls the target virtual entity to perform actions, the first target virtual object bound to the bone and the corresponding bone will remain in a fixed relative pose, and/or the first target virtual object bound to the bone and the corresponding bone will remain in a matching state, thus better meeting the personalized needs of the user.

In the present disclosure, the pose and/or size of the first target virtual object can be adjusted multiple times. After each adjustment, the user can switch the perspective to assess whether the adjusted first target virtual object meets the expectation, and stop the adjustment operation when the adjustment effect meets the expectation. Pose adjustment can be achieved by manipulating the virtual handset to control the movement or rotation of the first target virtual object. Size adjustment can be achieved by positioning the virtual handset on the boundary of the first target virtual object and moving it to expand or shrink the boundary. Alternatively, pressing a shrink button (e.g., the HOME key) can reduce the size of the first target virtual object, while pressing an expand button (e.g., the view key) can enlarge it, which is not limited here.

In another implementation scenario of the present disclosure, to enable the user to create a customized virtual entity in a virtual space easily, the present disclosure can also present a skeletal model of a virtual entity and an entity creation panel in the virtual space based on an instruction for creating a virtual entity. This allows the user to efficiently and conveniently customize the virtual entity by using the entity creation panel, which enhances both visuality and interactivity. The process of creating a target virtual entity based on an entity creation panel and a skeletal model provided by the embodiment of the present disclosure will be explained in detail below, with reference to FIG. 4.

Figure 4:
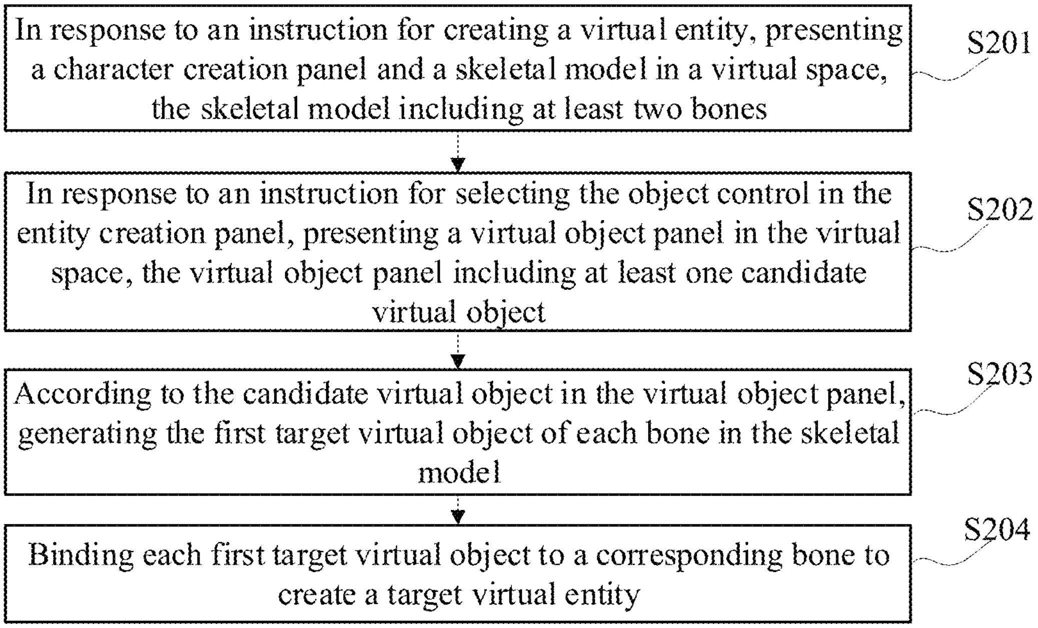
FIG. 4 is a flowchart of a second method for creating a virtual entity according to an embodiment of the present disclosure.

As illustrated in FIG. 4, the method may include the following steps.

S201, in response to an instruction for creating a virtual entity, presenting a character creation panel and a skeletal model in a virtual space, the skeletal model including at least two bones.

Figure 5:
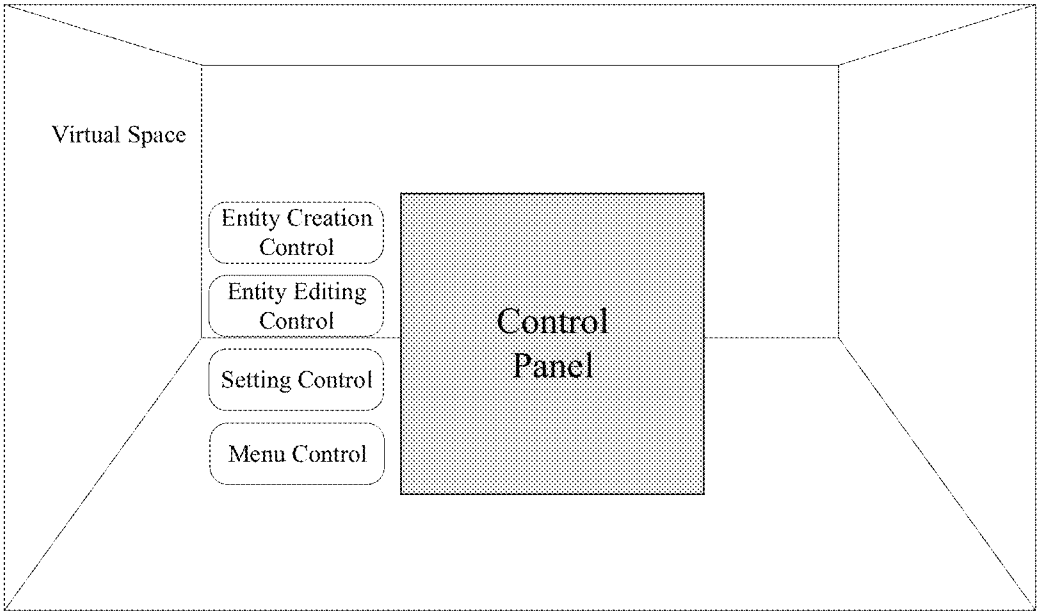
FIG. 5 is a schematic diagram of presenting various controls and panels in a virtual space according to an embodiment of the present disclosure.

Optionally, when the user enters the virtual space, various functional controls, control panels, background content and the like will be presented in the virtual space. The background content is determined according to the media content presented in the virtual space. For example, if the media content is a video stream, the background content can be the background content of the video stream, or it can also be preset background content. Moreover, the various functional controls in the virtual space include, but are not limited to, an entity creation control, an entity editing control, a setting control and a menu control, so that the user can trigger any functional control to open an interactive interface or an interactive function associated with the functional space. Different sub-panels can be set on the control panel, such as a space creation sub-interface, so that the user can select the corresponding sub-panel for creation or interaction. FIG. 5 illustrates various controls and panels presented in the virtual space as an example.

Figure 6:
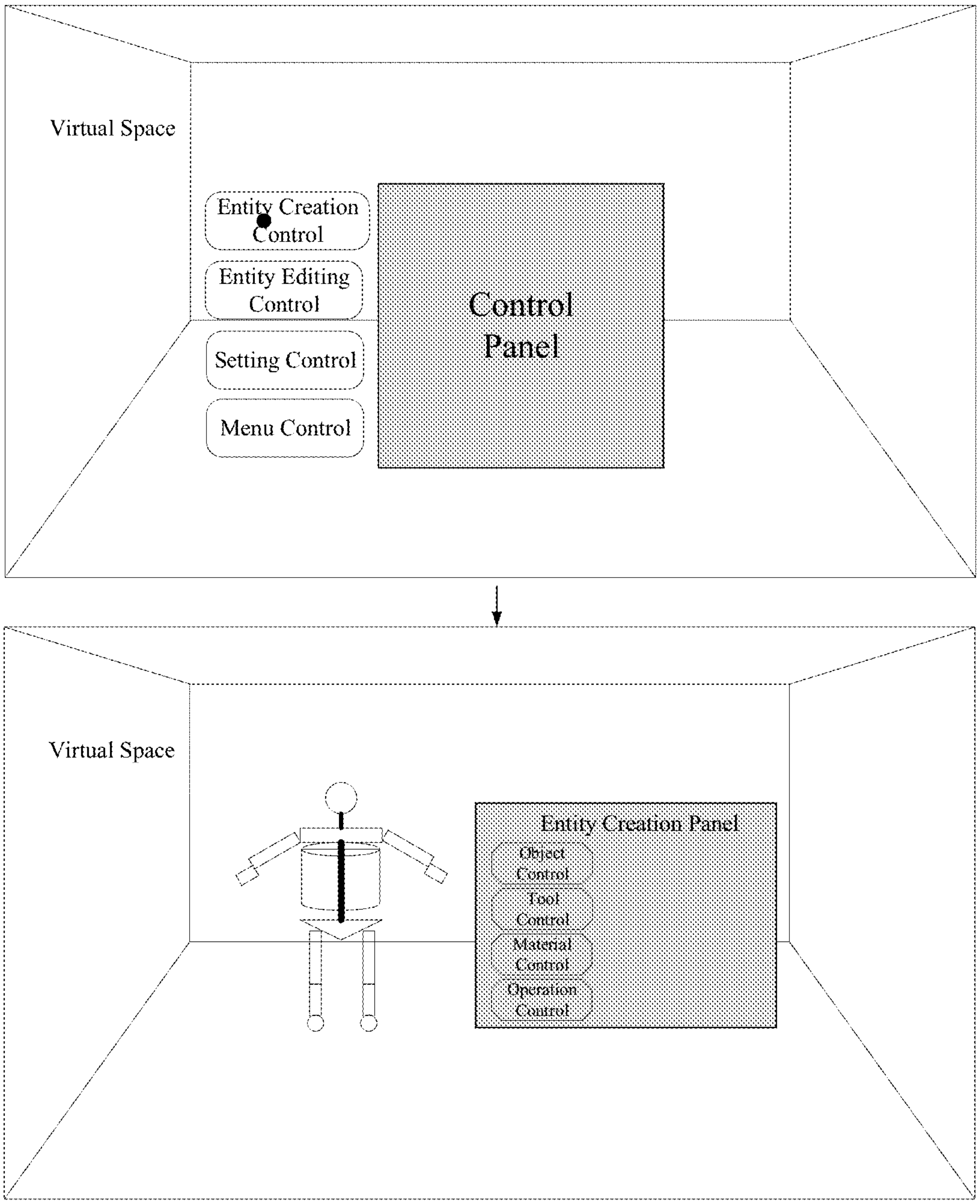
FIG. 6 is a schematic diagram of presenting an entity creation panel and a skeletal model in a virtual space according to an embodiment of the present disclosure.

Further, the user can trigger any functional control or panel for interaction according to operation requirements. For example, when the user need to create a customized virtual entity, the user can select the entity creation control in the virtual space by using a controller to manipulate a virtual handset, so that the entity creation panel and the skeletal model can be presented in the virtual space, as illustrated in FIG. 6. It should be understood that the manipulation of the virtual handset in the present disclosure can also be realized by gestures, etc., which is not limited here.

In addition, the user can adjust the display positions of the entity creation panel and/or the skeletal model according to interaction requirements, so as to facilitate the observation of the skeletal model and/or the entity creation panel from different angles.

An object control, a tool control, a material control and an operation control can be arranged in the entity creation panel, so that the user can select any control in the entity creation panel to open an interactive panel associated with the control. Further, based on the interactive panel, decoration or mounting is performed on the skeletal model to realize the creation of the virtual entity.

S202, in response to an instruction for selecting the object control in the entity creation panel, presenting a virtual object panel in the virtual space, the virtual object panel including at least one candidate virtual object.

When the user needs to create a customized virtual entity based on the skeletal model presented in the virtual space, the user can control the virtual handset, through the controller and the like, to move to the object control in the entity creation panel, and press a confirm button (e.g., trigger button) to select the object control. After the electronic device detecting the instruction for selecting the object control, the virtual object panel can be presented in a display area of the entity creation panel in the virtual space. Further, the target virtual object of each bone object in the skeletal model can be generated according to the at least one candidate virtual object in the virtual object panel, laying the foundation for creating the target virtual entity.

Figure 7:
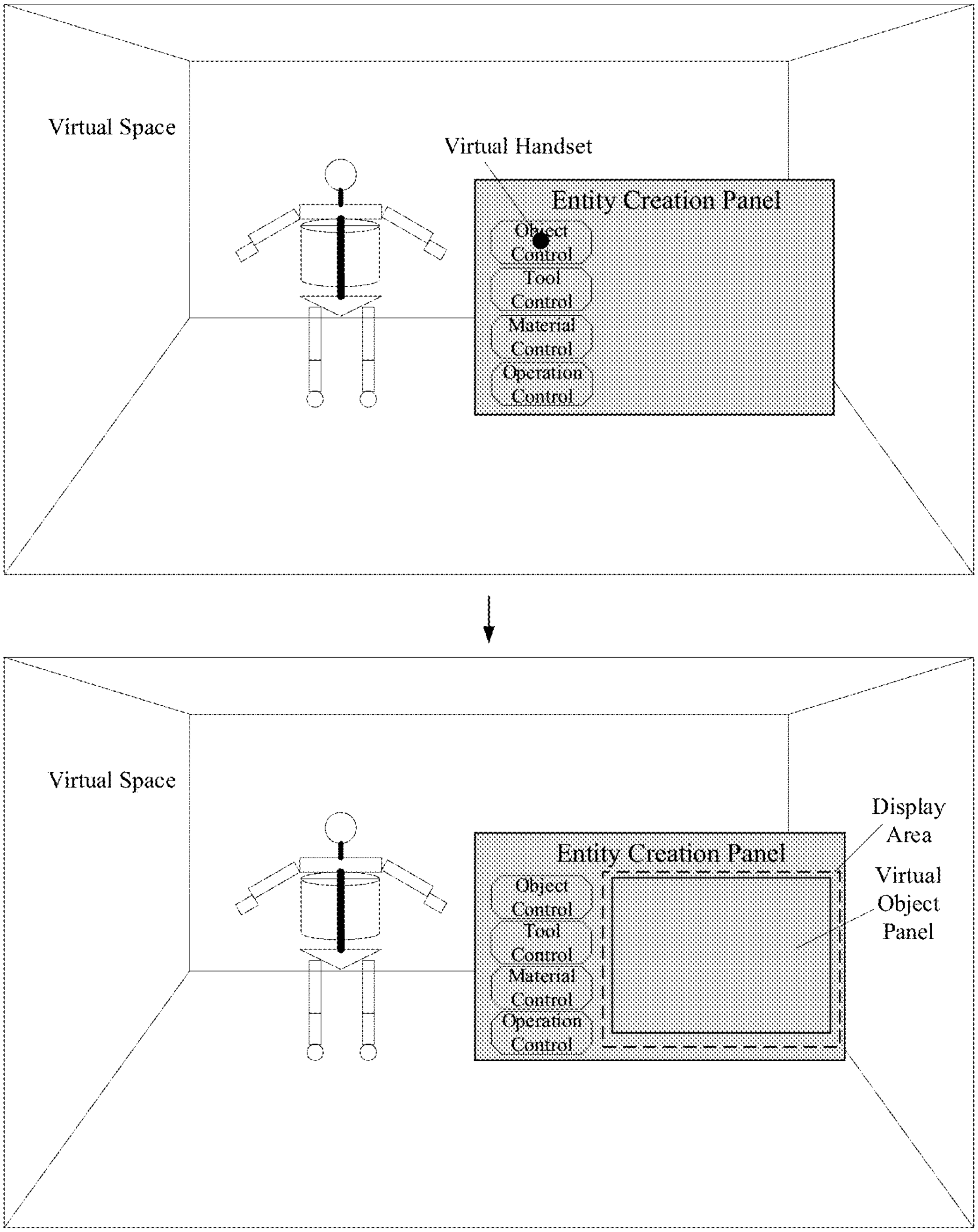
FIG. 7 is a schematic diagram of presenting a virtual object panel in a virtual space according to an embodiment of the present disclosure.

For example, as illustrated in FIG. 7, when the user controls the virtual handset to select the object control in the entity creation panel, the display area of the entity creation panel in the virtual space will present the virtual object panel.

S203, according to the candidate virtual object in the virtual object panel, generating the first target virtual object of each bone in the skeletal model.

In some implementations, when generating the first target virtual object for each bone in the skeletal model, the user can manipulate a virtual handset, by using a controller and the like, to hover over any candidate virtual object in the virtual object panel, and then press a confirm button to select the candidate virtual object. Then, the selected candidate virtual object can be dragged to a desired position in the virtual space and the confirm button can be released to place the selected virtual object at the position.

In the case that the user wants to use the selected candidate virtual object as the first target virtual object, the operation of selecting virtual objects from the virtual object panel may be stopped. In the case that the user wants to generate the first target virtual object based on a plurality of candidate virtual objects, the user may repeatedly manipulate the virtual handset, by using the controller and the like, to select the candidate virtual objects from the virtual object panel and place the candidate virtual objects at suitable positions. Each selected candidate virtual object is placed at a different suitable position to avoid the plurality of candidate virtual objects overlapping each other and causing obstruction.

Subsequently, after the selection of the plurality of candidate virtual objects is completed, the first target virtual object can be generated based on the plurality of virtual objects.

Optionally, the first target virtual object is generated based on the plurality of candidate virtual objects as follows. Firstly, the user may manipulate the virtual handset, by using the controller and the like, to box-select the plurality of candidate virtual objects. Then, the virtual handset is controlled to move to the tool control in the character creation panel, and a confirm button is pressed to send an instruction for selecting the tool control to the electronic device. When the electronic device receives the instruction for selecting the tool control, a tool panel is presented in the virtual space. Thirdly, the user controls the virtual handset to move to a position where a grouping control is located on the tool panel, and then a confirm button is pressed to send an instruction for selecting the grouping control to the electronic device, so that the electronic device can group the plurality of box-selected candidate virtual objects to obtain a first object group. Then, the obtained first object group can be determined as the first target virtual object corresponding to the bones in the skeletal model.

Considering that the skeletal model includes a plurality of bones, and the process of generating the first target virtual object for each bone is the same or similar, the present disclosure illustrates the generation of the first target virtual object for a single bone as an example.

Figure 8A:
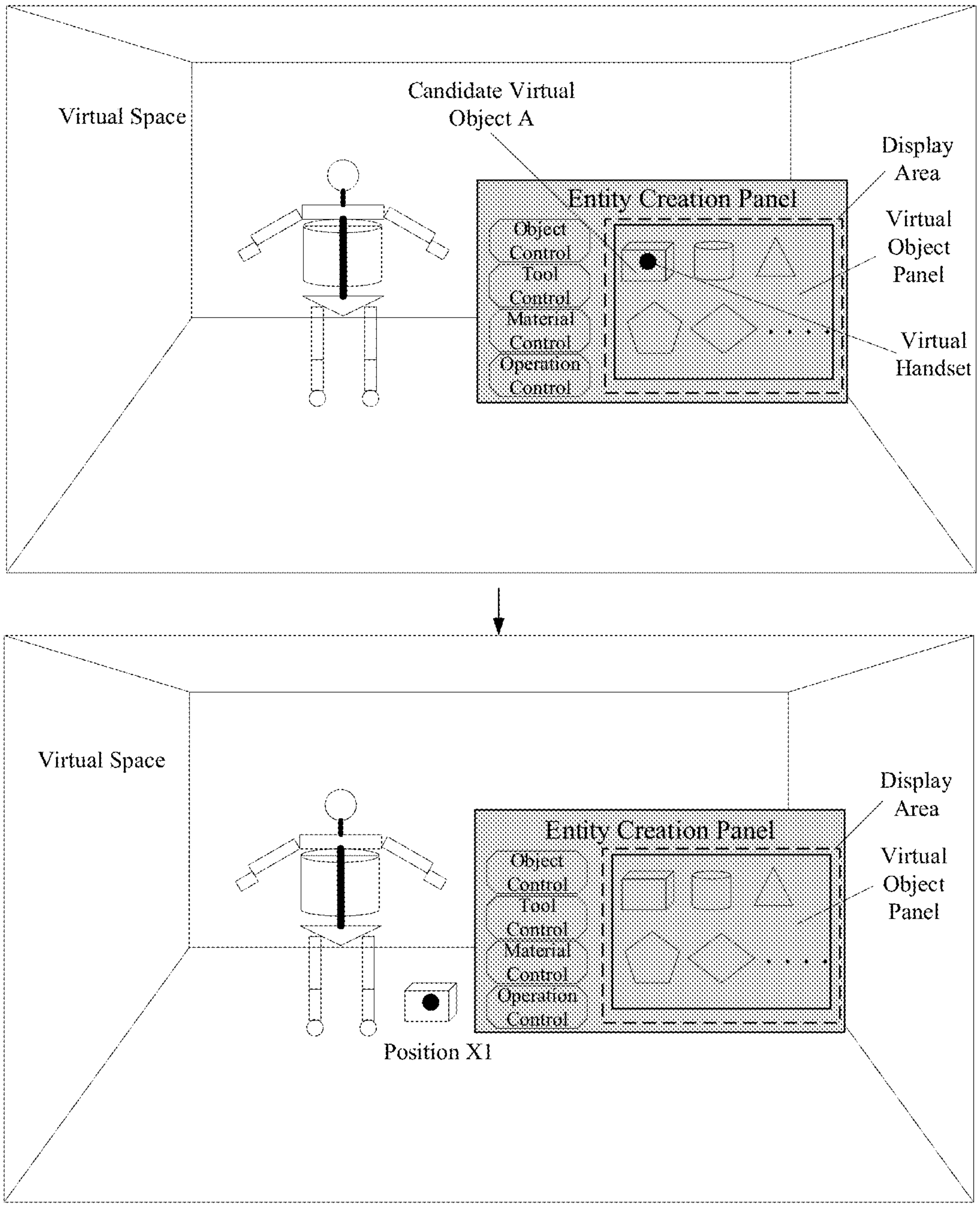
FIG. 8A is a schematic diagram of selecting a candidate virtual object A from a virtual object panel and placing the candidate virtual object A at position X1 according to an embodiment of the present disclosure.
Figure 8B:
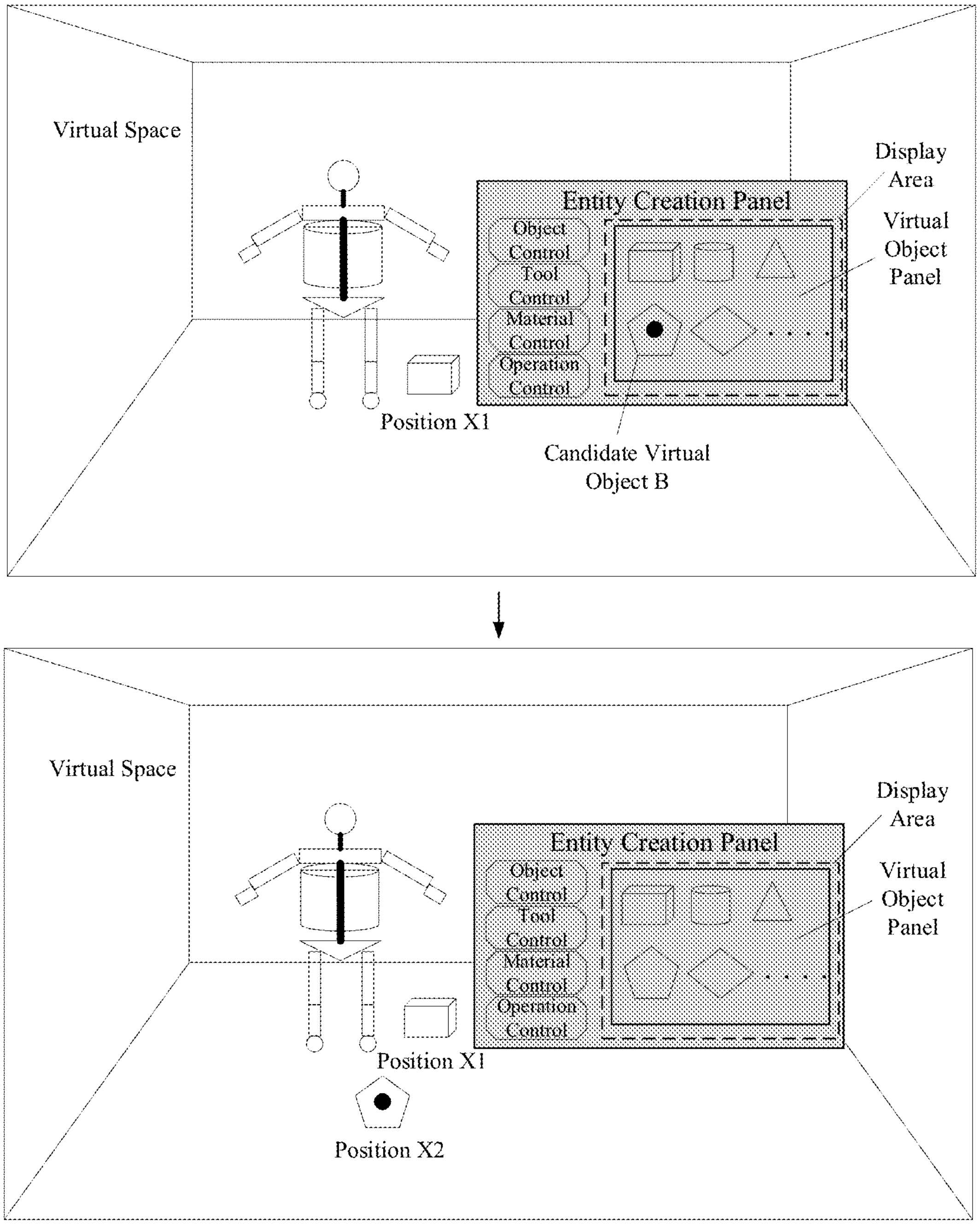
FIG. 8B is a schematic diagram of selecting a candidate virtual object B from a virtual object panel and placing the candidate virtual object B at position X2 according to an embodiment of the present disclosure.
Figure 8C:
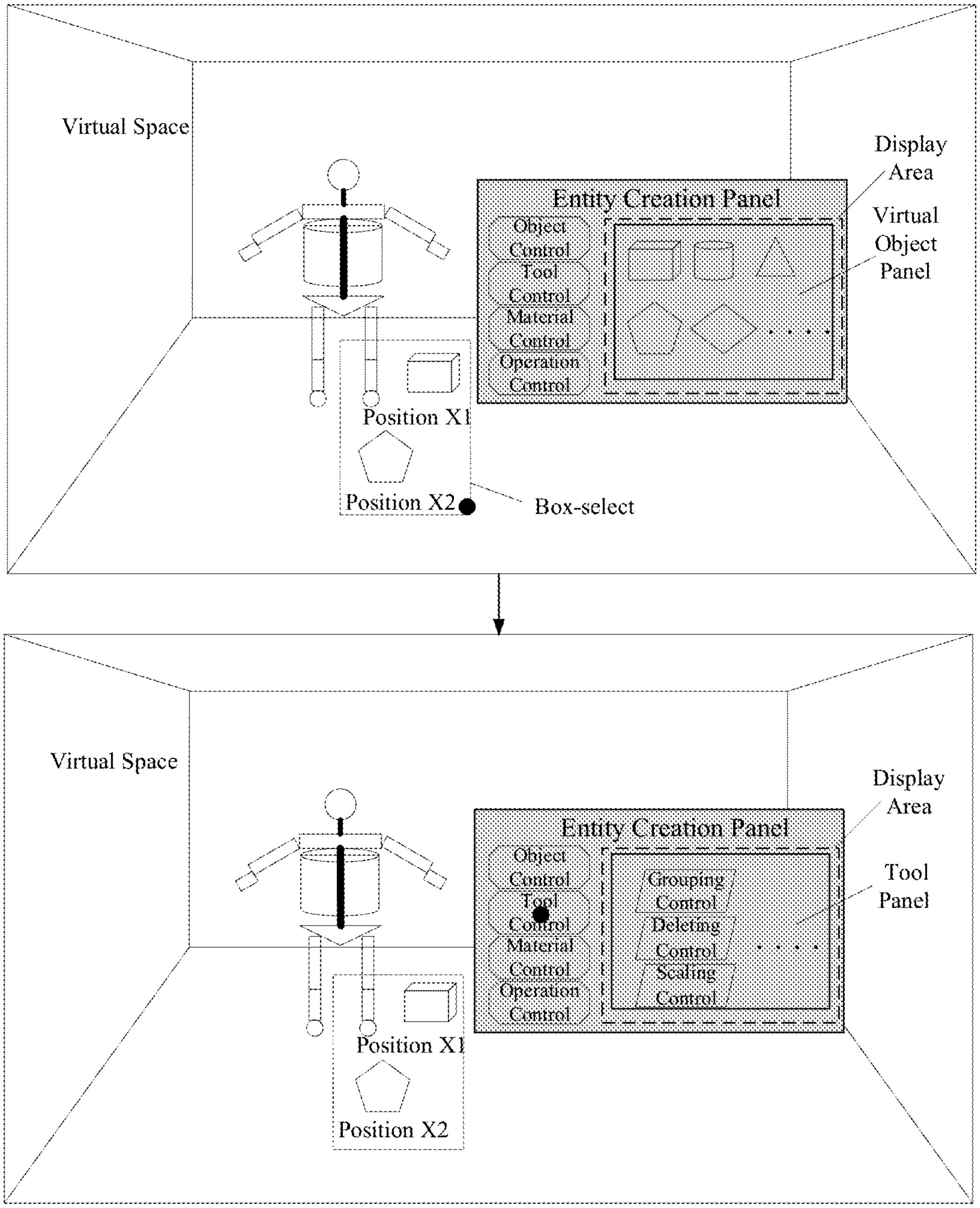
FIG. 8C is a schematic diagram of box-selecting candidate virtual objects A and B and opening a tool panel according to an embodiment of the present disclosure.
Figure 8D:
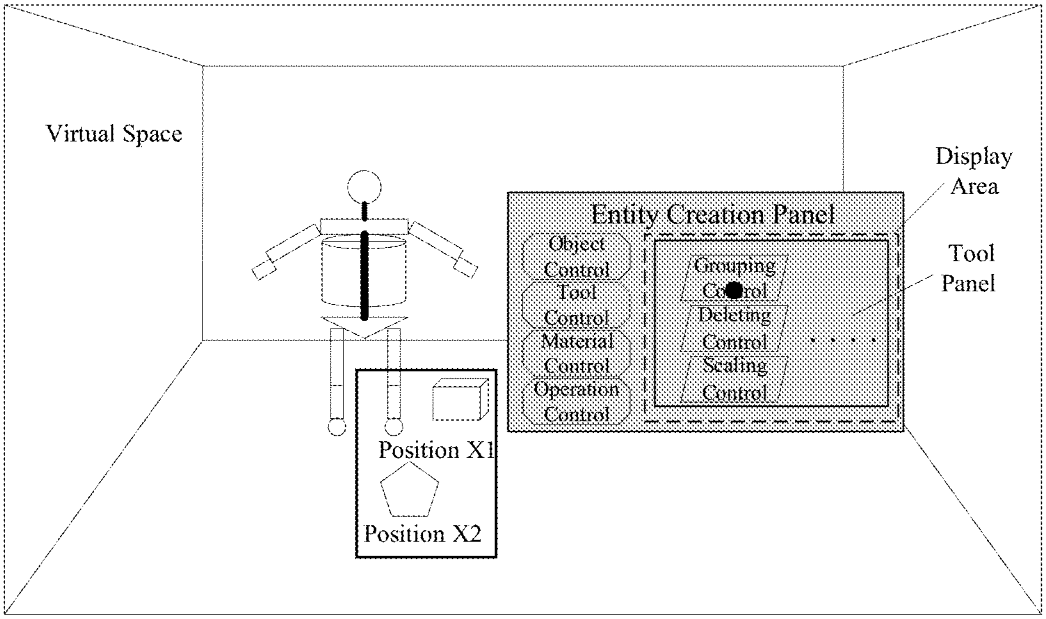
FIG. 8D is a schematic diagram of grouping box-selected candidate virtual objects A and B into an object group according to an embodiment of the present disclosure.

As illustrated in FIG. 8A, assuming that the bone is thigh bone, the user can select the candidate virtual object A from the virtual object panel by manipulating the virtual handset. The selected candidate virtual object A is dragged from the virtual object panel to the position X1 of the virtual space, and the trigger button is released to place the virtual object at the position X1. In the case that the user wants to take the candidate virtual object A as the first target virtual object of the thigh bone, the virtual object selection operation can be stopped, and the candidate virtual object A is taken as the first target virtual object of the thigh bone. In the case that the user wants to set an object group including a plurality of candidate virtual objects for the thigh bone, the user can control the virtual handset to select the candidate virtual object B from the virtual object panel and place the candidate virtual object B at the position X2 of the virtual space, as illustrated in FIG. 8B. Then, the virtual handset is controlled to box-select the candidate virtual object A and the candidate virtual object B, and then the tool control in the character creation panel is selected, so as to present the tool panel in the virtual space, as illustrated in FIG. 8C. Further, the user controls the virtual handset to select the grouping control in the tool panel, so as to group the box-selected candidate virtual object A and candidate virtual object B into an object group, as illustrated in FIG. 8D. Then, the object group is determined as the first target virtual object of the thigh bone.

It should be understood that the candidate virtual object A and the candidate virtual object B may be the same virtual object or different virtual objects, which is not limited here.

S204, binding each first target virtual object to a corresponding bone to create a target virtual entity.

According to the present disclosure, the skeletal model of the virtual entity and the entity creation panel are presented in the virtual space. This allows the user to efficiently and conveniently customize the virtual entity by using the entity creation panel, which enhances both visuality and interactivity.

It should be noted that when creating a virtual entity based on the virtual object panel in the virtual space, the user may encounter difficulty in creating the virtual entity that meets the user's personalized needs because the shape or style of the candidate virtual object in the virtual object panel do not meet the user's personalized needs. For this reason, in addition to presenting the virtual object panel in the virtual space, the present disclosure also presents optional tools such as a brush for generating the virtual object in the virtual space. This allows the user to use virtual object generation tools to create the target virtual entity that meets the user's personalized needs in the virtual space. Thus, it is convenient for the user to use the brush and other generation tools to draw the first target virtual object needed in the virtual space according to the customization needs of the virtual entity, thus meeting the user's personalized needs.

Further, in addition to presenting the virtual object panel and/or generation tools, there are alternative methods available to draw the first target virtual object in the virtual space, such as manipulating the movement trajectory of the virtual handset. This enables the user to generate the corresponding first target virtual object for each bone in the skeletal model using various approaches, thereby enriching the implementation options for the user in generating the first target virtual object.

According to the technical solution provided by the embodiment of the present disclosure, based on an instruction for creating a virtual entity, a skeletal model of the virtual entity is presented in a virtual space. Subsequently, at least one first target virtual object is determined, followed by binding each first target virtual object to a corresponding bone in the skeletal model to create a target virtual entity. By presenting the skeletal model of the virtual entity in the virtual space, the present disclosure enables an ordinary user to customize the virtual entity by mounting a virtual object onto each bone of the skeletal model. This allows the ordinary user to easily customize a virtual entity without the need to learn and master 3D art software or gain specialized knowledge in virtual entity creation. This can reduce the difficulty of creating the virtual entity by the ordinary user, simplify the steps of customization of the virtual entities by the ordinary user, enable the ordinary user to have a higher level of freedom in creating the virtual entity, and improve the enthusiasm of the ordinary user in creating the virtual entity. Moreover, the presentation of the entity creation panel in the virtual space allows the user to efficiently and conveniently customize the virtual entity by using the entity creation panel, which enhances both visuality and interactivity.

Figure 9:
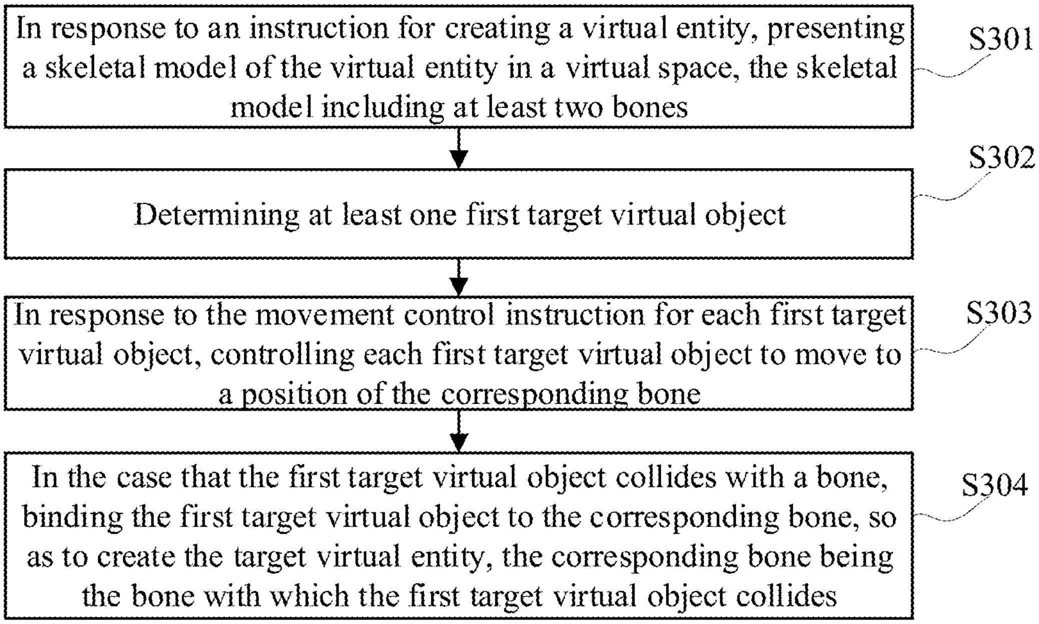
FIG. 9 is a flowchart of a third method for creating a virtual entity according to an embodiment of the present disclosure.

The process of binding each first target virtual object to the corresponding bone to create the target virtual entity in the present disclosure will be further explained with reference to FIG. 9. As illustrated in FIG. 9, the method includes the following steps.

S301, in response to an instruction for creating a virtual entity, presenting a skeletal model of the virtual entity in a virtual space, the skeletal model including at least two bones.

S302, determining at least one first target virtual object.

S303, in response to the movement control instruction for each first target virtual object, controlling each first target virtual object to move to a position of the corresponding bone.

S304, in the case that the first target virtual object collides with a bone, binding the first target virtual object to the corresponding bone, so as to create the target virtual entity, the corresponding bone being the bone with which the first target virtual object collides.

Optionally, the virtual handset can be controlled by the controller and the like in turn to control each first target virtual object to move to the position of the corresponding bone, so as to bind each first target virtual object to the corresponding bone.

Figure 10:
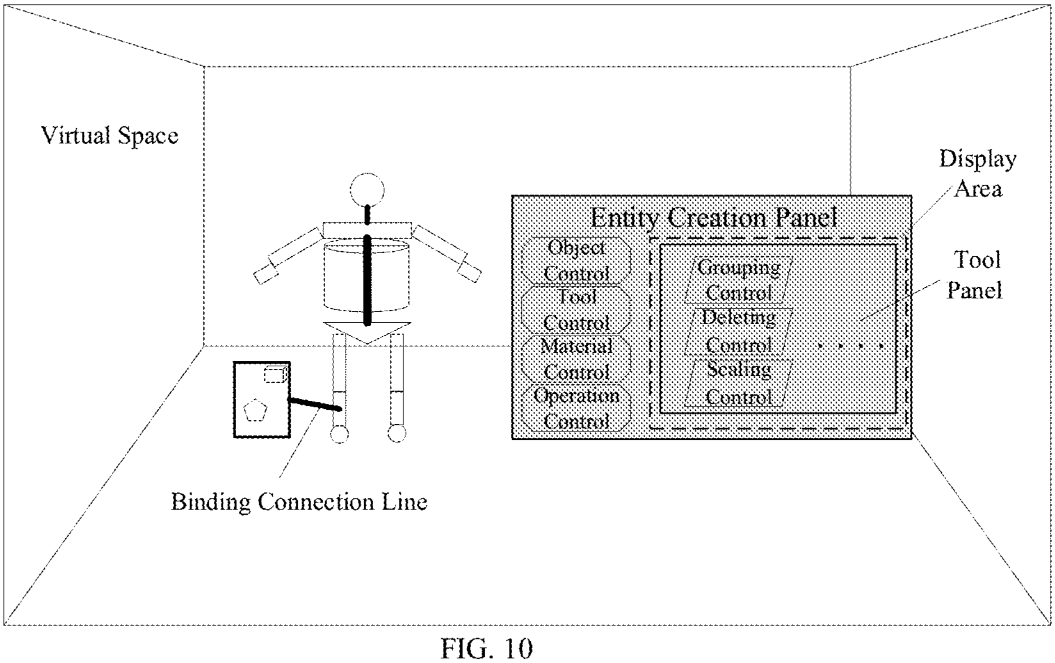
FIG. 10 is a schematic diagram of establishing a binding relationship between a first target virtual object and a skeleton according to an embodiment of the present disclosure.

In the process of moving the first target virtual object to the position of the corresponding bone, whether there is any collision (touch) between the first target virtual object and the corresponding bone is determined in real time. In the case that the first target virtual object collides with the corresponding bone, it is determined that the first target virtual object establishes a binding relationship with the bone, that is, the first target virtual object has been successfully bound to the bone. The binding relationship between the first target virtual object and the bone can be embodied by a binding connection line, as illustrated in FIG. 10.

It should be noted that after binding the first target virtual object to the bone with which the first target virtual object collides, the user can adjust the relative pose of the first target virtual object and the bone at least once. For example, in the case that the first target virtual object is adjusted not to be in contact with the bone with which the first target virtual object collides, the binding connection line between the first target virtual object and the bone with which the first target virtual object collides is still displayed here. That is to say, no matter whether the adjusted first target virtual object is in contact with the bone with which the first target virtual object collides, the binding relationship between them is shown to the user through the binding connection line. Moreover, by displaying the binding connection line, it is also possible to clearly indicate which bone the first target virtual object is connected to when the first target virtual object is farther away from the bone with which the first target virtual object collides, so that the user is able to clearly determine which bone has a binding relationship with the first target virtual object.

In the present disclosure, determining whether the first target virtual object collides with the corresponding bone can be done by determining a distance between a point of the first target virtual object facing the corresponding bone and closest to the side of the corresponding bone, and a point of the corresponding bone facing the first target virtual object and closest to the side of the first target virtual object. Then, it is determined whether the distance is less than a preset distance. If the distance is less than the preset distance threshold, it is determined that the first target virtual object collides with the corresponding bone, otherwise it is determined that the first target virtual object does not collide with the bone. The preset threshold can be set flexibly based on the accuracy of collision detection, such as the preset distance threshold is 0 or 0.05, which is not limited here.

Of course, in addition to the above-mentioned method of determining whether the first target virtual object collides with the bone, other collision detection methods involving virtual entities in a virtual space can also be employed, which will not be elaborated here.

It can be understood that when it is determined that the first target virtual object collides with the bone, optional feedback such as vibration feedback, visual feedback, and/or audio feedback can be provided to the user. This enables the user to perceive the collision between the first target virtual object and the bone through tactile, visual, and/or auditory senses, thus confirming the successful binding of the first target virtual object to the corresponding bone. This enhances the user's sense of realism in the virtual space.

Considering that some bones in the skeletal model are distributed closely or that the first target virtual object is relatively large, it is possible for the first target virtual object to collide with multiple bones when moving towards the position of the corresponding bone.

In view of this situation, the present disclosure proposes a solution where the distances between the first target virtual object and each bone with which the first target virtual object collides are determined, the minimum distance among all the distances is selected, the bone corresponding to the minimum distance is determined as the target bone, and the first target virtual object is bound to the target bone, so as to establish a binding relationship between the target bone and the first target virtual object.

Determining the distances between the first target virtual object and each bone with which the first target virtual object collides is to determine the distances between a center point of the first target virtual object and a center point of each of the bones with which the first target virtual object collides.

The distances between a center point of the first target virtual object and a center point of each of the bones with which the first target virtual object collides can be calculated using the two-point distance formula, as described in the prior art, which will not be elaborated here.

In other words, in the present disclosure, in the case that the first target virtual object collides with a bone, binding the first target virtual object to the corresponding bone, includes: in the case that the first target virtual object collides with a plurality of bones, determining distances between the first target virtual object and each of the plurality of bones with which the first target virtual object collides; and binding the first target virtual object to the corresponding bone, the corresponding bone being a bone corresponding to a smallest distance among all the distances.

According to the technical solution provided by the embodiment of the present disclosure, based on an instruction for creating a virtual entity, a skeletal model of the virtual entity is presented in a virtual space. Subsequently, at least one first target virtual object is determined, followed by binding each first target virtual object to a corresponding bone in the skeletal model to create a target virtual entity. By presenting the skeletal model of the virtual entity in the virtual space, the present disclosure enables an ordinary user to customize the virtual entity by mounting a virtual object onto each bone of the skeletal model. This allows the ordinary user to easily customize a virtual entity without the need to learn and master 3D art software or gain specialized knowledge in virtual entity creation. This can reduce the difficulty of creating the virtual entity by the ordinary user, simplify the steps of customization of the virtual entities by the ordinary user, enable the ordinary user to have a higher level of freedom in creating the virtual entity, and improve the enthusiasm of the ordinary user in creating the virtual entity. In addition, in the case that the first target virtual object collides with a plurality of bones, binding the first target virtual object to the bone corresponding to the minimum distance ensures that the first target virtual object forms a binding relationship with the correct bone. This leads to improved accuracy and usability of the binding relationship.

As an optional implementation of the present disclosure, it is considered that after binding the first target virtual object to the corresponding bone, the user may need to adjust the first target virtual object bound to the corresponding bone, there is a need to unbind the bone from the first target virtual object. Therefore, the present disclosure, in addition to the previous embodiments, may further include: in response to an unbinding instruction sent by a user, cutting off the binding relationship between a bone corresponding to the unbinding instruction and a first target virtual object bound to the bone. This allows the user to either bind the unbound first target virtual object to other bones or bind a new first target virtual object to the unbound bone, meets the user's personalized virtual entity creation needs and further enhances flexibility and freedom in virtual entity creation.

Figure 11:
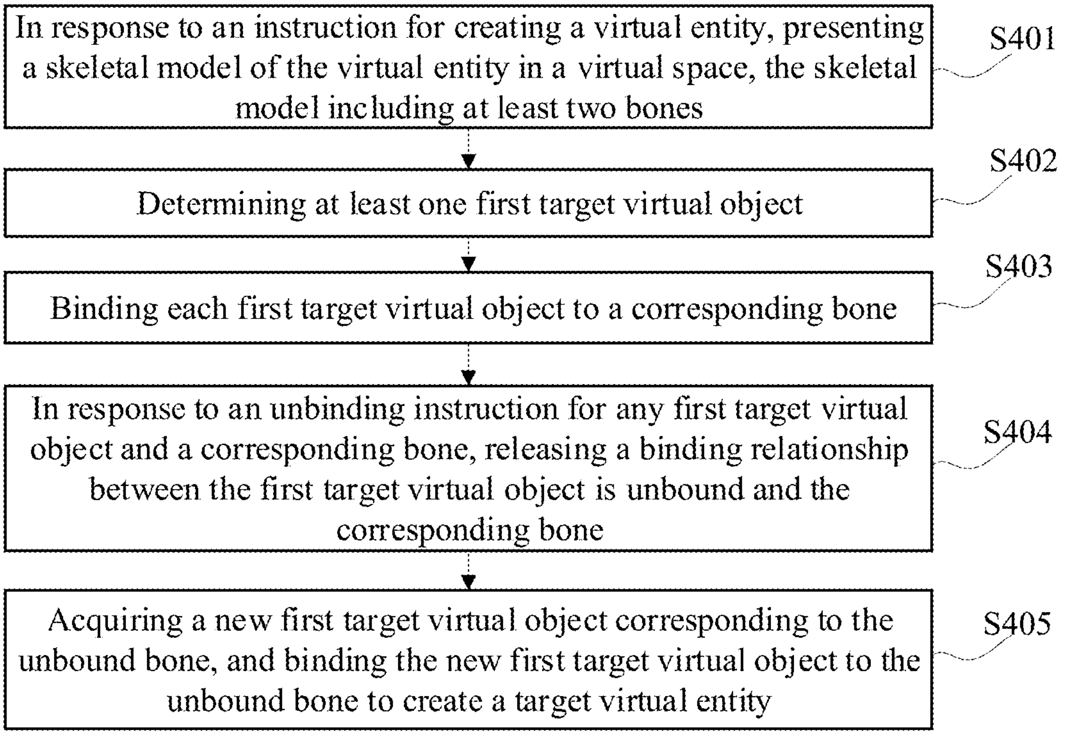
FIG. 11 is a flowchart of a fourth method for creating a virtual entity according to an embodiment of the present disclosure.

The process of unbinding a binding relationship between a bone and a first target virtual object bound to the bone in response to an unbinding instruction sent by a user will be explained below with reference to FIG. 11. As illustrated in FIG. 11, the method may include the following steps.

S401, in response to an instruction for creating a virtual entity, presenting a skeletal model of the virtual entity in a virtual space, the skeletal model including at least two bones.

S402, determining at least one first target virtual object.

S403, binding each first target virtual object to a corresponding bone.

S404, in response to an unbinding instruction for any first target virtual object and a corresponding bone, releasing a binding relationship between the first target virtual object is unbound and the corresponding bone.

Optionally, after binding a first target virtual object to any bone on the skeletal model, there might be a requirement to adjust the first target virtual object bound to the bone. In such cases, the user can manipulate the virtual handset to hover over the bone or its corresponding first target virtual object and send an unbinding instruction to the electronic device by pressing an unbind button on the controller (such as action button A or other combination buttons). Consequently, the electronic device displays a binding connection line between the bone and its corresponding first target virtual object based on the unbinding instruction. Subsequently, by triggering a cut-off button (such as the trigger button) on the controller, the displayed binding connection line is cut off (i.e., the binding connection line is disconnected), thereby releasing the binding relationship between the bone and the first target virtual object to which the bone is bound.

In another optional implementation, the user can also control the virtual handset, through the controller and the like, to hover over the binding connection line between the bone and the first target virtual object. Then, a preset button on the controller (such as the menu button or action button X) is pressed to send an unbinding instruction for the bone and the first target virtual object to the electronic device. Upon receiving the unbinding instruction, the electronic device cuts off the binding connection line between the bone and the first target virtual object, thereby achieving the unbinding operation.

Figure 12:
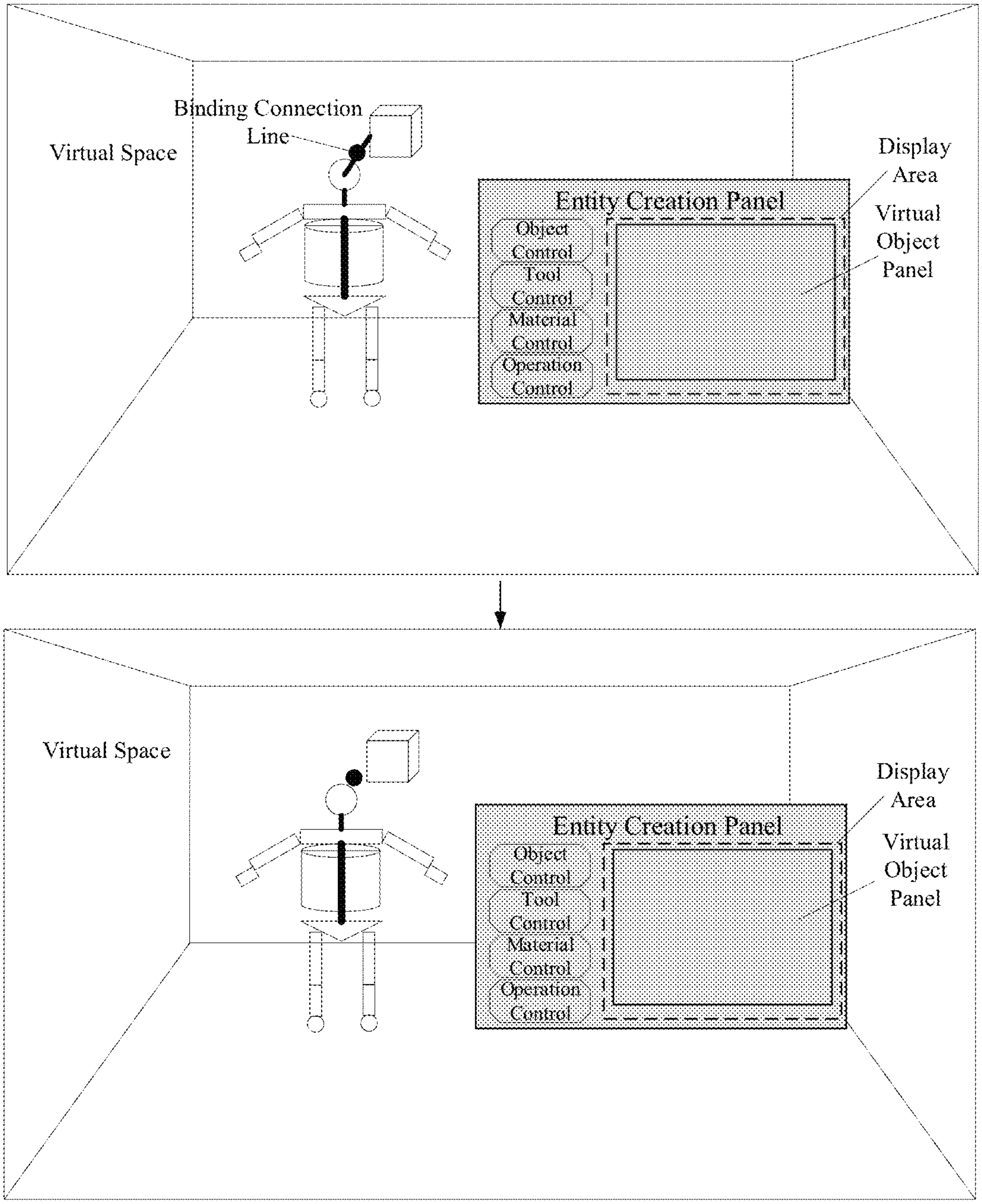
FIG. 12 is a schematic diagram of implementing an unbinding operation according to an unbinding instruction according to an embodiment of the present disclosure.

As illustrated in FIG. 12, for example, a user manipulates a virtual handset to hover over a binding connection line between a skull bone and a first target virtual object located on the skull bone. Then, by pressing a preset button on a controller, the user sends an instruction for unbinding the skull bone from the first target virtual object on the skull bone. Consequently, an electronic device, based on this unbinding instruction, disconnects the binding connection line between the skull bone and the first target virtual object, thereby completing the unbinding operation.

It is considered that the bone and the first target virtual object bound to the bone may obscure the binding connection line because of the display position, making it impossible to display the binding connection line.

Therefore, in the present disclosure, it is first determined whether the binding connection line is obscured before cutting off the binding connection line between the bone to be unbound and the first target virtual object on the bone according to the unbinding instruction. If it is determined that the binding connection line between the bone to be unbound and the first target virtual object on the bone is obscured and not displayed normally, first adjust the display position of the first target virtual object on the bone to be unbound so that the binding connection line between the bone to be unbound and the first target virtual object on the bone can be displayed normally. Afterwards, in response to the cutting operation of the binding connection line, the binding relationship between the bone to be unbound and the first target virtual object on the bone is released.

Figure 13:
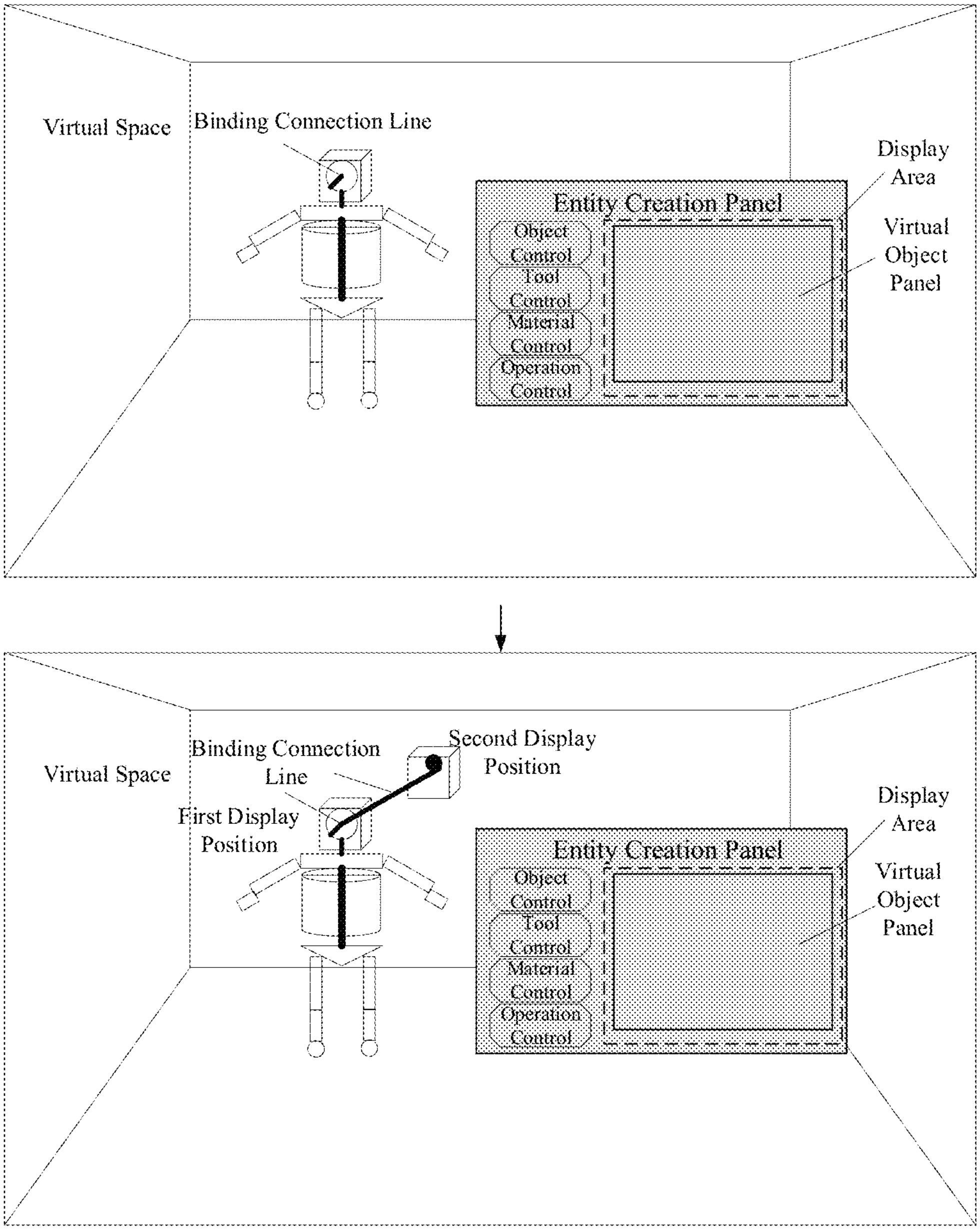
FIG. 13 is a schematic diagram of adjusting a display position of a first target virtual object according to an embodiment of the present disclosure.

In the present disclosure, the adjustment of the display position of the first target virtual object on the bone to be unbound can be carried out by manipulating the virtual handset to select the first target virtual object. Then, the virtual handset is used to control the first target virtual object to move from a first display position (a display position when the first target virtual object is bound to the bone to be unbound) to a second display position (any display position where the binding connection line can be displayed properly). This ensures that the binding connection line between the bone to be unbound and the first target virtual object on the bone is displayed properly. Please refer to FIG. 13 for a detailed implementation process.

S405, acquiring a new first target virtual object corresponding to the unbound bone, and binding the new first target virtual object to the unbound bone to create a target virtual entity.

Optionally, after releasing the binding relationship between any bone and the first target virtual object bound thereto, the user can generate a new first target virtual object for the unbound bone based on at least one candidate virtual object, and bind the new first target virtual object to the unbound bone, completing the creation of the target virtual entity.

The at least one candidate virtual object mentioned above can be located in the virtual space or within a virtual object panel in the virtual space, which is not limited here.

The process of generating a new first target virtual object and binding it to the unbound bone is implemented in a similar manner to the implementation process described in the previous embodiments. Please refer to the relevant embodiments for more detailed information, which will not be elaborated here.

In some implementations, considering that the number of unbound bones may be more than one, the present disclosure may also allow for the adjustment of virtual objects by rebinding the unbound first target virtual object to other unbound bones, excluding the original corresponding bone, through an exchanging process.

For example, assuming there are two unbound bones, a first unbound bone and a second unbound bone. The user can take a first target virtual object unbound from the first unbound bone as a new first target virtual object for the second unbound bone, and bind the new first target virtual object to the second unbound bone. Meanwhile, a first target virtual object unbound from the second unbound bone can be taken as a new first target virtual object for the first unbound bone, and the new first target virtual object is bound to the first unbound bone.

According to the technical solution provided by the embodiment of the present disclosure, based on an instruction for creating a virtual entity, a skeletal model of the virtual entity is presented in a virtual space. Subsequently, at least one first target virtual object is determined, followed by binding each first target virtual object to a corresponding bone in the skeletal model to create a target virtual entity. By presenting the skeletal model of the virtual entity in the virtual space, the present disclosure enables an ordinary user to customize the virtual entity by mounting a virtual object onto each bone of the skeletal model. This allows the ordinary user to easily customize a virtual entity without the need to learn and master 3D art software or gain specialized knowledge in virtual entity creation. This can reduce the difficulty of creating the virtual entity by the ordinary user, simplify the steps of customization of the virtual entities by the ordinary user, enable the ordinary user to have a higher level of freedom in creating the virtual entity, and improve the enthusiasm of the ordinary user in creating the virtual entity. Moreover, in the present disclosure, based on the unbinding instruction sent by the user, the binding relationship between the first target virtual object and the corresponding bone is released, allowing the user to bind a new first target virtual object to the unbound bone. This meets the user's personalized virtual entity creation needs and further enhances flexibility and freedom in virtual entity creation.

As an optional implementation of the present disclosure, after each first target virtual object is bound to the corresponding bone, or after the target virtual object is created, the user may need to add more virtual objects to any bone on the skeletal model, such as adding another target virtual object (such as a second target virtual object) on the basis of the bound first target virtual object, so as to achieve the purpose of enriching the virtual entity. Thus, to allow the user to add a third target virtual object to the bone already bound with the original first target virtual object (i.e., the second target virtual object), upon detecting a new binding instruction and if the bone corresponding to the new binding instruction is already bound with the second target virtual object, the present disclosure merges the second target virtual object with the third target virtual object to obtain the first target virtual object, and then binds the first target virtual object to the corresponding bone.

Figure 14:
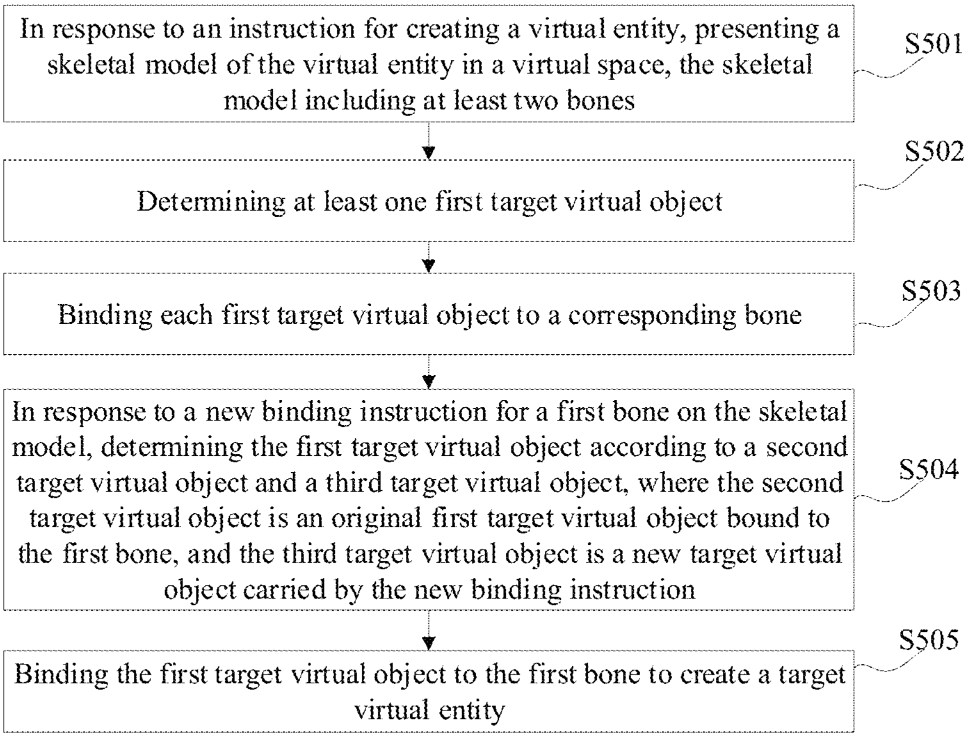
FIG. 14 is a flowchart of a fifth method for creating a virtual entity according to an embodiment of the present disclosure.

The adding of a third target virtual object to any bone as described above will be explained below with reference to FIG. 14. As illustrated in FIG. 14, the method may include the following steps.

S501, in response to an instruction for creating a virtual entity, presenting a skeletal model of the virtual entity in a virtual space, the skeletal model including at least two bones.

S502, determining at least one first target virtual object.

S503, binding each first target virtual object to a corresponding bone.

S504, in response to a new binding instruction for a first bone on the skeletal model, determining the first target virtual object according to a second target virtual object and a third target virtual object, where the second target virtual object is an original first target virtual object bound to the first bone, and the third target virtual object is a new target virtual object carried by the new binding instruction. The first bone is any bone on the skeletal model.

S505, binding the first target virtual object to the first bone to create a target virtual entity.

In some implementations, after binding the original first target virtual object (second target virtual object) to the bone on the skeletal model, the user may find the second target virtual object bound to any bone is too monotonous. Therefore, there is a requirement to enrich the virtual object bound to the bone.

Based on this, the user may generate a new target virtual object (third target virtual object) for the bone to be treated based on at least one candidate virtual object presented in the virtual space or within the virtual object panel. Subsequently, the virtual handset is manipulated to control the movement of the third target virtual object towards the position of the bone to be treated. During the movement of the third target virtual object, real-time detection is performed to check whether the third target virtual object collides with the bone.

When the third target virtual object collides with the bone, the first target virtual object can be determined according to the second target virtual object and the third target virtual object. The specific determination methods are as follows.

Method 1

When the skeletal model and the at least one candidate virtual object are presented in the virtual space, the user may first manipulate the virtual handset, by using the controller and the like, to box-select the second target virtual object and the third target virtual object on the bone to box the second target virtual entity and the third target virtual entity together. Next, by pressing a preset button (such as a menu button) on the controller, a menu interface associated with the menu button is displayed in the virtual space. From the menu interface, the user can select a "grouping" option, and according to the grouping instruction triggered by the user, the electronic device groups the box-selected second target virtual object and third target virtual object, resulting in a second object group. Finally, the obtained second object group is determined as the first target virtual object.

Method 2

When the skeletal model and the entity creation panel are presented in the virtual space, the user can first control the virtual handset to move to the tool control in the entity creation panel, and a confirm button is pressed to send an instruction for selecting the tool control to the electronic device. When the electronic device receives the instruction for selecting the tool control, a tool panel is presented in the virtual space. Then, the user controls the virtual handset to move to a position where a grouping control is located on the tool panel, and then a confirm button is pressed to send an instruction for selecting the grouping control to the electronic device, so that the electronic device can group the selected second target virtual object and third target virtual object, resulting in a second object group. Subsequently, the obtained second object group is determined as the first target virtual object.

Then, the determined first target virtual object is bound to the corresponding bone to create the target virtual entity.

Considering that a binding relationship has already been established between the second target virtual object and the bone, it is necessary to first release the binding relationship between the second target virtual object and the bone before binding the first target virtual object to the bone.

The process of unbinding and binding has been explained in detail in the aforementioned embodiments, and will not be repeated here.

Figure 15A:
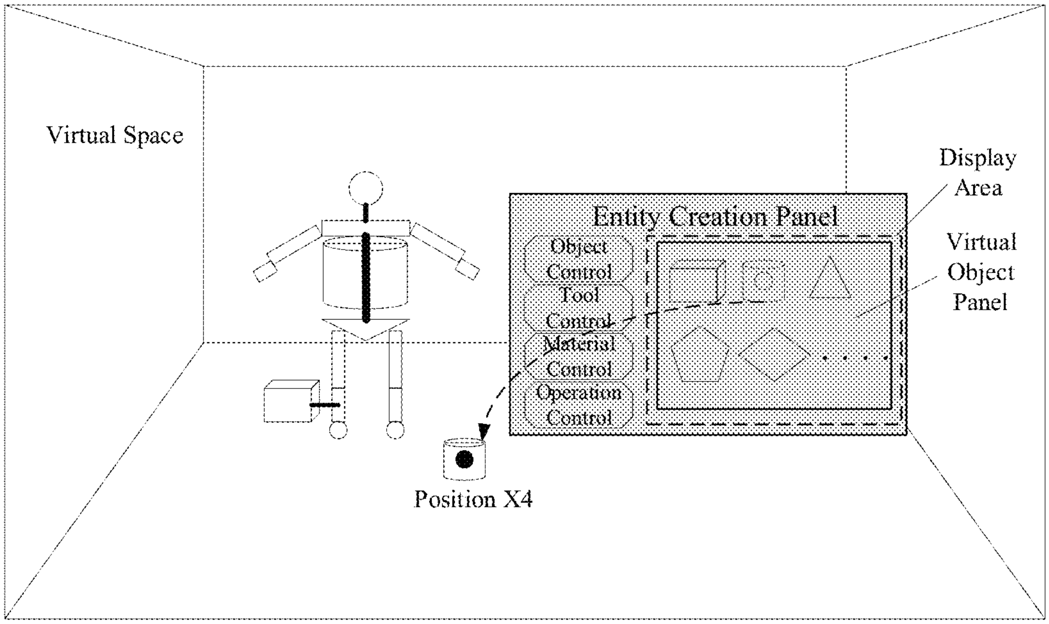
FIG. 15A is a schematic diagram of placing a candidate virtual object D at position X4 in a virtual space according to an embodiment of the present disclosure.
Figure 15B:
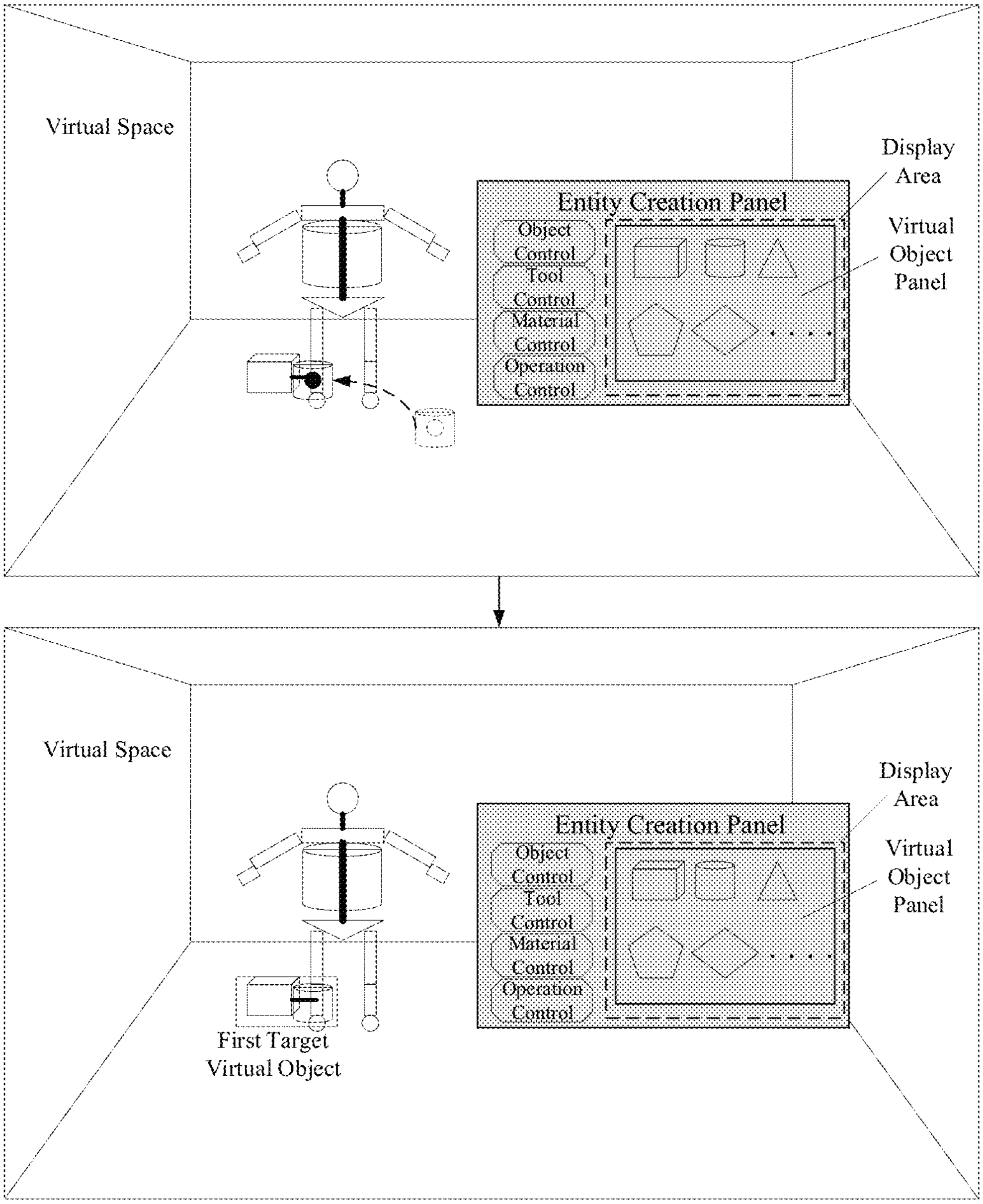
FIG. 15B is a schematic diagram of generating a first target virtual object according to an embodiment of the present disclosure.

For example, assuming that the user needs to add a third target virtual object to the shin bone. The user can use the virtual handset to select a candidate virtual object D from the virtual object panel, drag the selected candidate virtual object D from the virtual object panel to the position X4 in the virtual space, and then release the trigger button to place the candidate virtual object at the position X4, as illustrated in FIG. 15A. Then, the candidate virtual object D is used as the third target virtual object and controlled to move towards the position of the shin bone. When the candidate virtual object D collides with the shin bone, the first target virtual object can be generated based on the second target virtual object of the shin bone and the virtual object D, as illustrated in FIG. 15B. Subsequently, the binding relationship between the second target virtual object and the shin bone is released, and the first target virtual object is bound to the shin bone.

That is, when there is a need to bind a new target virtual object to any bone, the present disclosure provides a solution where the target virtual object bound to the bone remains unchanged, and the user only edits or adjusts the new target virtual object, then merges the new target virtual object with the target virtual object as an additional component, and then mounts them together onto the corresponding bone. This approach facilitates the user to incrementally modify the target virtual object bound to the bone, that is, to add new target virtual object to the bone, providing greater flexibility for personalized adjustments to the virtual object.

According to the technical solution provided by the embodiment of the present disclosure, based on an instruction for creating a virtual entity, a skeletal model of the virtual entity is presented in a virtual space. Subsequently, at least one first target virtual object is determined, followed by binding each first target virtual object to a corresponding bone in the skeletal model to create a target virtual entity. By presenting the skeletal model of the virtual entity in the virtual space, the present disclosure enables an ordinary user to customize the virtual entity by mounting a virtual object onto each bone of the skeletal model. This allows the ordinary user to easily customize a virtual entity without the need to learn and master 3D art software or gain specialized knowledge in virtual entity creation. This can reduce the difficulty of creating the virtual entity by the ordinary user, simplify the steps of customization of the virtual entities by the ordinary user, enable the ordinary user to have a higher level of freedom in creating the virtual entity, and improve the enthusiasm of the ordinary user in creating the virtual entity. Moreover, in the present disclosure, when a new target virtual object is bound to any bone on the skeletal model according to a detected new binding instruction, if it is determined that an original first target virtual object, i.e., a second target virtual object, is bound to the bone, the second target virtual object and a third target virtual object are merged to obtain a first target virtual object, and then the first target virtual object is bound to the corresponding bone. This enables the user to add a third target virtual object to a bone which is already bound with an original first target virtual object, thus enriching the virtual object bound to the bone. Additionally, the entire operation is more intuitive for the user, thereby improving the interactivity during the creation of the virtual entity.

Figure 16:
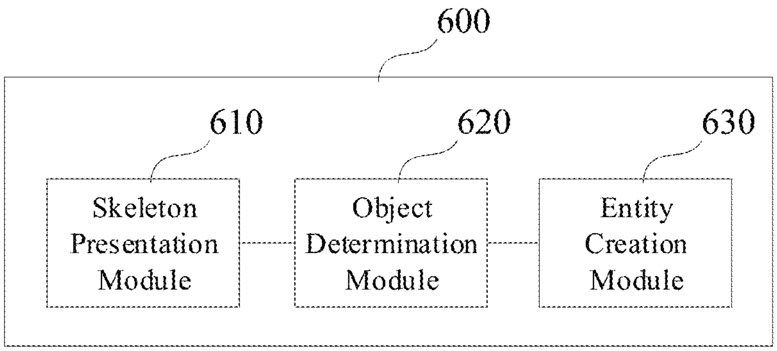
FIG. 16 is a schematic block diagram of an apparatus for creating a virtual entity according to an embodiment of the present disclosure.

An apparatus for creating a virtual entity provided by an embodiment of the present disclosure is described below with reference to FIG. 16. FIG. 16 is a block diagram of an apparatus for creating a virtual entity according to an embodiment of the present disclosure.

As illustrated in FIG. 16, the apparatus for creating a virtual entity 600 includes a skeleton presentation module 610, an object determination module 620 and an entity creation module 630.

The skeleton presentation module 610 is configured to, in response to an instruction for creating a virtual entity, present a skeletal model of the virtual entity in a virtual space, the skeletal model including at least two bones;

the object determination module 620 is configured to determine at least one first target virtual object; and the entity creation module 630 is configured to bind each first target virtual object to the corresponding bone to create a target virtual entity.

In an optional implementation of the embodiment of the present disclosure, the first target virtual object is determined based on at least one candidate virtual object presented in the virtual space.

In an optional implementation of the embodiment of the present disclosure, the entity creation module 630 includes:

a binding unit configured to, in response to a movement control instruction for each first target virtual object, bind each first target virtual object to the corresponding bone.

In an optional implementation of the embodiment of the present disclosure, the binding unit is specifically configured to:

in response to the movement control instruction for each first target virtual object, control each first target virtual object to move to a position of the corresponding bone; and in the case that the first target virtual object collides with a bone, bind the first target virtual object to the corresponding bone, the corresponding bone being the bone with which the first target virtual object collides.

In an optional implementation of the embodiment of the present disclosure, the binding unit is further configured to:

in the case that the first target virtual object collides with a plurality of bones, determine distances between the first target virtual object and each of the bones with which the first target virtual object collides; and bind the first target virtual object to the corresponding bone, the corresponding bone being the bone corresponding to the smallest distance among all the distances.

In an optional implementation of the embodiment of the present disclosure, the binding unit is further configured to:

determine distances between a center point of the first target virtual object and a center point of each of the bones with which the first target virtual object collides.

In an optional implementation of the embodiment of the present disclosure, the apparatus 600 further includes:

a relative pose determination module configured to determine a relative pose of the first target virtual object relative to the corresponding bone.

In an optional implementation of the embodiment of the present disclosure, the apparatus 600 further includes:

a pose determination module configured to acquire an input signal corresponding to the virtual entity, and determine a pose of at least one bone in the skeletal model of the virtual entity according to the input signal; and a display module configured to, according to the relative pose and the pose of the at least one bone, determine a pose of each first target virtual object, and display the first target virtual object.

In an optional implementation of the embodiment of the present disclosure, the apparatus 600 further includes:

an unbinding module configured to, in response to an unbinding instruction for any first target virtual object and the corresponding bone, release a binding relationship between the first target virtual object and the corresponding bone.

In an optional implementation of the embodiment of the present disclosure, the unbinding module includes:

a binding connection line display unit configured to display a binding connection line between the first target virtual object and the corresponding bone; and a binding connection line cutting unit configured to, in response to a cutting operation on the binding connection line, release the binding relationship between the first target virtual object and the corresponding bone.

In an optional implementation of the embodiment of the present disclosure, the apparatus 600 further includes:

a new binding detection module configured to, in response to a new binding instruction for any bone on the skeletal model, determine the first target virtual object according to a second target virtual object and a third target virtual object, where the second target virtual object is an original first target virtual object bound to the bone, and the third target virtual object is a new target virtual object carried by the new binding instruction; and a binding module configured to bind the first target virtual object to the corresponding bone.

In an optional implementation of the embodiment of the present disclosure, the new binding detection module is specifically configured to:

group the second target virtual object and the third target virtual object to obtain an object group, and determine the object group as the first target virtual object.

In an optional implementation of the embodiment of the present disclosure, the unbinding module is specifically configured to:

release a binding relationship between the second target virtual object between the corresponding bone.

In an optional implementation of the embodiment of the present disclosure, in the case that the virtual entity is a virtual character, the skeletal model of the virtual entity is a virtual character skeletal model.

According to the technical solution provided by the embodiment of the present disclosure, based on an instruction for creating a virtual entity, a skeletal model of the virtual entity is presented in a virtual space. Subsequently, at least one first target virtual object is determined, followed by binding each first target virtual object to a corresponding bone in the skeletal model to create a target virtual entity. By presenting the skeletal model of the virtual entity in the virtual space, the present disclosure enables an ordinary user to customize the virtual entity by mounting a virtual object onto each bone of the skeletal model. This allows the ordinary user to easily customize a virtual entity without the need to learn and master 3D art software or gain specialized knowledge in virtual entity creation. This can reduce the difficulty of creating the virtual entity by the ordinary user, simplify the steps of customization of the virtual entities by the ordinary user, enable the ordinary user to have a higher level of freedom in creating the virtual entity, and improve the enthusiasm of the ordinary user in creating the virtual entity.

It should be understood that the embodiment of the apparatus and the embodiment of the method can correspond to each other, and similar descriptions can refer to the embodiment of the method, and to avoid repetition, is not repeated here again. Specifically, the apparatus 600 shown in FIG. 16 can execute the embodiments of the method corresponding to FIG. 1, and the aforementioned and other operations and/or functions of each module in the apparatus 600 are respectively designed to implement the corresponding processes of each method in FIG. 1. For simplicity, it will not be repeated here.

The apparatus 600 of the embodiments of the present disclosure is described from the perspective of the functional module in conjunction with the drawings. It should be understood that the functional module may be implemented through hardware, software instructions, or a combination of hardware and software modules. Specifically, the steps of the method embodiment in the embodiments of the present disclosure may be accomplished by the integrated logic circuit of hardware in the processor and/or the instruction in the form of software. The steps of the method disclosed in conjunction with the embodiments of the present disclosure may be directly performed by a hardware decoding processor, or performed by combining hardware and software modules in a decoding processor. Optionally, the software module may be located in a random memory, a flash memory, a read-only memory, a programmable read-only memory, an electrically erasable programmable memory, a register, and other mature storage media in the art. The storage medium is located in the memory, and the processor reads the information in the memory to complete the steps in the above method embodiment in combination with its hardware.

Figure 17:
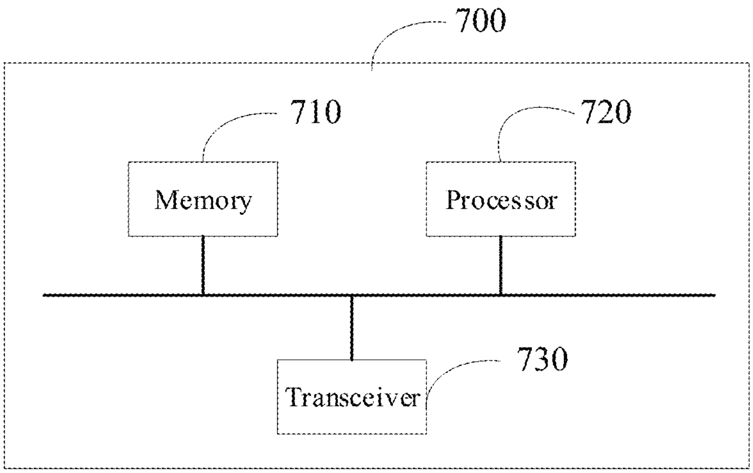
FIG. 17 is a schematic block diagram of an electronic device according to an embodiment of the present disclosure.

FIG. 17 is a schematic block diagram of an electronic device according to the embodiment of the present disclosure. As shown in FIG. 17, the electronic device 700 may include:

a memory 710 and a processor 720. The memory 710 is used to store the computer program and transfer the program code to the processor 720. In other words, the processor 720 may call and run the computer program from the memory 710 to achieve the method for creating the virtual entity in the embodiments of the present disclosure.

For example, the processor 720 may be used to execute the embodiment of the aforementioned method for creating the virtual entity based on the instruction in the computer program.

In some embodiments of the present disclosure, the processor 720 may include but is not limited to:

a general-purpose processor, a digital signal processor (DSP), an application specific integrated circuit (ASIC), a field programmable gate arrays (FPGA), or other programmable logic devices, discrete gate or transistor logic devices, discrete hardware components, and the like.

In some embodiments of the present disclosure, the memory 710 includes but is not limited to:

a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct Rambus RAM (DR RAM).

In some embodiments of the present disclosure, the computer program may be divided into one or more modules, which are stored in the memory 710 and executed by the processor 720 to complete the method for creating the virtual entity provided in the present disclosure. The one or more modules may be a series of computer program instruction segments capable of completing a specific function, and the instruction segments are used to describe the execution process of the computer program in the electronic device.

As shown in FIG. 17, the electronic device 700 may further include:

a transceiver 730, which may be connected to the processor 720 or the memory 710.

The processor 720 may control the transceiver 730 to communicate with other devices, specifically, sending information or data to other devices, or receiving information or data sent by the other devices. The transceiver 730 may include a transmitter and a receiver. The transceiver 730 may further include antennas, and the number of antennas may be one or more.

It should be understood that the various components in the electronic device are connected through a bus system, which includes a power bus, a control bus, and a status signal bus, in addition to a data bus.

The present disclosure also provides a computer storage medium on which a computer program is stored, and when the computer program is executed by the processor, it enables the processor to execute the method for creating the virtual entity provided by the embodiments of the above method.

The embodiment of the present disclosure also provides a computer program product including a program instruction, when the program instruction is run on the electronic device, causing the electronic device to execute the method for creating the virtual entity provided by the embodiments of the above method.

When implemented using software, it may be fully or partially implemented in the form of the computer program product. The computer program product includes one or more computer instructions. When loading and executing the computer program instruction on the computer, all or part of the processes or functions according to the embodiments of the present disclosure are generated. The computer may be a general purpose computer, a specialized computer, a computer network, or other programmable devices. The computer instruction may be stored in the non-transient computer-readable storage medium or transmitted from one non-transient computer-readable storage medium to another, for example, the computer instruction may be transmitted from a website site, a computer, a server, or a data center through the wired method (e.g., coaxial cable, fiber optic, digital subscriber line (DSL)) or the wireless method (e.g., infrared, wireless, microwave, etc.) to another website site, computer, server, or data center. The non-transient computer-readable storage medium may be any available medium that the computer can access, or a data storage device such as a server or data center that contains one or more available medium. The available medium may be a magnetic medium (e.g., a floppy disk, a hard disk, a magnetic tape), an optical medium (e.g., a digital video disc (DVD)), or a semiconductor medium (e.g., a solid-state disk (SSD), etc.), and the like.

Those skilled in the art can appreciate that the modules and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Professional technician may use different methods to implement the described functions for each specific application, but such implementation should not be considered beyond the scope of the present disclosure.

In the several embodiments provided in the present disclosure, it should be understood that the systems, apparatuses, and methods disclosed, may be implemented in other ways. For example, the embodiments of the apparatus described above are only illustrative. For example, the division of the modules is only a logical function division, there may be other division approaches in actual implementation, for example, a plurality of modules or components may be combined or may be integrated into another system, or some features may be ignored, or not implemented. In another point, the mutual coupling or direct coupling or communication connection shown or discussed may be indirect coupling or communication connection through some interfaces, devices or modules, and may be in electrical, mechanical or other forms.

The module illustrated as a separated component may or may not be physically separated, and a component displayed as a module may or may not be a physical module, that is, it may be located in one place, or may also be distributed to multiple network units. Part or all of the modules can be selected according to actual needs to achieve the purpose of the solution of the embodiment. For example, various functional modules in various embodiments of the present disclosure may be integrated into one processing module, each module may exist separately physically, or two or more modules may be integrated into one module.

What are described above is related to the specific embodiments of the present disclosure only, and the scope of the present disclosure is not limited to this. Anyone skilled in the art can easily think of changes or substitutions within the scope of the technology disclosed in the present disclosure, which should be covered within the protection scope of the present disclosure. Therefore, the scopes of the present disclosure are defined by the accompanying claims.

The invention claimed is:

1. A computer-implemented method for creating a virtual entity, comprising:

in response to an instruction for creating the virtual entity, presenting, by a processor, a skeletal model of the virtual entity in a virtual space, wherein the skeletal model comprises at least two bones;

determining at least one first virtual object;

binding each first virtual object to a corresponding bone to create a first virtual entity;

obtaining a relative pose of a first virtual object relative to the corresponding bone;

acquiring an input signal corresponding to the virtual entity, and determining a pose of at least one bone in the skeletal model of the virtual entity according to the input signal; and according to the relative pose and the pose of the at least one bone, obtaining a pose of each first virtual object, and displaying the first virtual object.

2. The method according to claim 1, wherein the first virtual object is obtained based on at least one candidate virtual object presented in the virtual space.

3. The method according to claim 1, wherein the binding each first virtual object to a corresponding bone comprises:

in response to a movement control instruction for each first virtual object, binding each first virtual object to the corresponding bone.

4. The method according to claim 3, wherein the in response to a movement control instruction for each first virtual object, binding each first virtual object to the corresponding bone, comprises:

in response to the movement control instruction for each first virtual object, controlling each first virtual object to move to a position of the corresponding bone; and in a case that the first virtual object collides with a bone, binding the first virtual object to the corresponding bone, the corresponding bone being the bone with which the first virtual object collides.

5. The method according to claim 4, wherein the in a case that the first virtual object collides with a bone, binding the first virtual object to the corresponding bone, comprises:

in a case that the first virtual object collides with a plurality of bones, obtaining distances between the first virtual object and each of the plurality of bones with which the first virtual object collides; and binding the first virtual object to the corresponding bone, the corresponding bone being a bone corresponding to a smallest distance among all the distances.

6. The method according to claim 5, wherein the obtaining distances between the first virtual object and each of the plurality of bones with which the first virtual object collides comprises:

obtaining distances between a center point of the first virtual object and a center point of each of the plurality of bones with which the first virtual object collides.

7. The method according to claim 1, further comprising:

in response to an unbinding instruction for a first virtual object and a corresponding bone, releasing a binding relationship between the first virtual object and the corresponding bone.

8. The method according to claim 7, wherein the in response to an unbinding instruction for a first virtual object and a corresponding bone, releasing a binding relationship between the first virtual object and the corresponding bone, comprises:

displaying a binding connection line between the first virtual object and the corresponding bone; and in response to a cutting operation on the binding connection line, releasing the binding relationship between the first virtual object and the corresponding bone.

9. The method according to claim 1, further comprising:

in response to a new binding instruction for a first bone on the skeletal model, obtaining the first virtual object according to a second virtual object and a third virtual object, wherein the second virtual object is an original first virtual object bound to the first bone, and the third virtual object is a new virtual object carried by the new binding instruction; and binding the first virtual object to the first bone.

10. The method according to claim 9, wherein the determining the first virtual object according to a second virtual object and a third virtual object comprises:

grouping the second virtual object and the third virtual object to obtain an object group, and obtaining the object group as the first virtual object.

11. The method according to claim 9, wherein before the binding the first virtual object to the first bone, the method further comprises:

releasing a binding relationship between the second virtual object and the first bone.

12. The method according to claim 1, wherein in a case that the virtual entity is a virtual character, the skeletal model of the virtual entity is a virtual character skeletal model.

13. An electronic device, comprising:

a processor and a memory, wherein the memory is configured to store computer programs, and the processor is configured to call and run the computer programs stored in the memory to execute a method for creating a virtual entity, and the method for creating the virtual entity comprises:

in response to an instruction for creating the virtual entity, presenting a skeletal model of the virtual entity in a virtual space, wherein the skeletal model comprises at least two bones;

determining at least one first virtual object;

binding each first virtual object to a corresponding bone to create a first virtual entity;

obtaining a relative pose of a first virtual object relative to the corresponding bone;

acquiring an input signal corresponding to the virtual entity, and determining a pose of at least one bone in the skeletal model of the virtual entity according to the input signal; and according to the relative pose and the pose of the at least one bone, obtaining a pose of each first virtual object, and displaying the first virtual object.

14. The electronic device according to claim 13, wherein the first virtual object is obtained based on at least one candidate virtual object presented in the virtual space.

15. The electronic device according to claim 13, wherein the binding each first virtual object to a corresponding bone comprises:

in response to a movement control instruction for each first virtual object, binding each first virtual object to the corresponding bone.

16. A non-transitory computer-readable storage medium configured to store computer programs, the computer programs cause a processor to:

in response to an instruction for creating the virtual entity, present a skeletal model of the virtual entity in a virtual space, wherein the skeletal model comprises at least two bones;

determine at least one first virtual object;

bind each first virtual object to a corresponding bone to create a first virtual entity;

obtaining a relative pose of a first virtual object relative to the corresponding bone;

acquiring an input signal corresponding to the virtual entity, and determining a pose of at least one bone in the skeletal model of the virtual entity according to the input signal; and according to the relative pose and the pose of the at least one bone, obtaining a pose of each first virtual object, and displaying the first virtual object.

17. The storage medium according to claim 16, wherein the first virtual object is obtained based on at least one candidate virtual object presented in the virtual space.

18. The storage medium according to claim 16, wherein the binding each first virtual object to a corresponding bone comprises:

in response to a movement control instruction for each first virtual object, binding each first virtual object to the corresponding bone.

19. The storage medium according to claim 18, wherein the in response to a movement control instruction for each first virtual object, binding each first virtual object to the corresponding bone, comprises:

in response to the movement control instruction for each first virtual object, controlling each first virtual object to move to a position of the corresponding bone; and in a case that the first virtual object collides with a bone, binding the first virtual object to the corresponding bone, the corresponding bone being the bone with which the first virtual object collides.

20. The storage medium according to claim 19, wherein the in a case that the first virtual object collides with a bone, binding the first virtual object to the corresponding bone, comprises:

in a case that the first virtual object collides with a plurality of bones, obtaining distances between the first virtual object and each of the plurality of bones with which the first virtual object collides; and binding the first virtual object to the corresponding bone, the corresponding bone being a bone corresponding to a smallest distance among all the distances.

* * * * *